(12) United States Patent
Castner

(10) Patent No.: US 6,460,861 B1
(45) Date of Patent: Oct. 8, 2002

(54) FLEXIBLE ELONGATED SEAL WITH MULTIPLE TYPES OF REINFORCEMENTS

(75) Inventor: Raymond R Castner, Hopkinton, IA (US)

(73) Assignee: International Truck Intellectual Property Company, L.L.C., Warrenville, IL (US)

( * ) Notice: Subject to any disclaimer, the term of this patent is extended or adjusted under 35 U.S.C. 154(b) by 0 days.

(21) Appl. No.: 09/781,929

(22) Filed: Feb. 12, 2001

(51) Int. Cl.$^7$ ................................................ F16J 15/02
(52) U.S. Cl. ........................ 277/642; 277/651; 277/906; 277/921
(58) Field of Search .................. 277/630, 637, 277/640, 642, 651, 906, 921; 49/475.1, 495.1; 296/146.2, 146.9

(56) References Cited

U.S. PATENT DOCUMENTS

| | | | |
|---|---|---|---|
| 3,172,800 A | * | 3/1961 | Truesdell ................ 277/642 X |
| 3,165,793 A | * | 1/1965 | Lynch .................... 277/642 X |
| 4,310,164 A | * | 1/1982 | Mesnel |
| 4,749,203 A | * | 6/1988 | Bright |
| 4,976,067 A | * | 12/1990 | Maass .................... 277/642 X |
| 4,982,529 A | * | 1/1991 | Mesnel |

* cited by examiner

*Primary Examiner*—Anthony Knight
*Assistant Examiner*—Karlena D. Schwing
(74) *Attorney, Agent, or Firm*—Jeffrey P. Calfa; Neil T. Powell; Dennis Kelly Sullivan

(57) ABSTRACT

A flexible elongated seal for use in sealing the interface between a window frame and the corresponding window glass of a vehicle. The flexible elongated seal has a rigid reinforcement embedded within a portion of it and a flexible wire mesh reinforcement embedded within a different portion of it. The portion of the flexible elongated seal that is reinforced by the rigid reinforcement is very stiff which has advantages, but it cannot be bent along its length to conform to curved portions of a perimeter of the window frame. The portion of the flexible elongated seal that is reinforced by the wire mesh reinforcement is slightly less stiff than the portion reinforced by the rigid reinforcement, but it can be bent along its length to enable it to conform to curved portions of the window frame.

25 Claims, 15 Drawing Sheets

FLEXIBLE ELONGATED SEAL WITH MULTIPLE TYPES OF REINFORCEMENTS

BACKGROUND

This invention relates to seals for sealing gaps between two or more components disposed adjacent to one another. In particular this invention relates to seals that have certain characteristics in common. The seals that this invention relates to are constructed primarily of a soft, flexible, durable material. Examples of such a soft flexible durable material include many elastomers and plastics as well as any other materials that have mechanical properties similar to elastomers. The seals that this invention relates to have elongated bodies the length of which is many times greater than a largest sectional width of the elongated body. For purposes of this disclosure a. sectional width of the elongated body is a width of the elongated body in any direction perpendicular to a central axis of the elongated body and at any point along the central axis of the elongated body. The seals that this invention relates to can be substantially elastically bent along at least some portion of their central axis. The seals that this invention relates to include mounting features which facilitates the mounting of the seals to other components and sealing features which fill the gaps between two or more adjacent components when those adjacent components and the seals are properly position relative to one another. In the interest of simplicity, seals that are constructed according to all of the aforementioned guidelines will herein after be referred to as flexible elongated seals. Flexible elongated seals as defined above are particularly well suited for use in certain applications where it is desirable to seal a relatively long, narrow gap that curves and bends in different directions. Flexible elongated seals are, for example, commonly used to seal a gap between a door and a door frame or a gap between a window and a window frame. The flexible elongated seal is attached with the aid of its mounting features to one of the components in such a position that its sealing features will be within and will seal a gap between the two or more components that the seal is intended to seal to one another.

As was mentioned above there are many different designs of flexible elongated seals. Differences between different designs of flexible elongated seals include differences in shape and size of the cross-section of the elongated body of the flexible elongated seal and differences in materials that the elongated body is constructed of. Another difference between different designs of flexible elongated seals is that some include reinforcements embedded in their elongated bodies and others do not. Additionally there are different types of reinforcements that are embedded in the elongated bodies of flexible elongated seals. Each different type of reinforcement that can be utilized in a flexible elongated seal provides a different amount of stiffening against certain types of deformation that a flexible elongated seal can be subjected to. Reinforcements of flexible elongated seals are generally constructed primarily to stiffen the flexible elongated seal against one or both of two important types of deformation that the flexible elongated seal can be subjected to. A first of these two types of deformation that can occur to the flexible elongated seal is axial bending. For the purposes of this disclosure axial bending of the flexible elongated seal is defined to be bending of the elongated body of the flexible elongated seal along its central axis. Axial bending of some parts of the flexible elongated seal is desirable to allow the flexible elongated seal to be mounted to a component with one or more bends in its elongated flexible body. Flexible elongated seals are mounted in such an elastically deformed manner in order to conform to the complex shapes of the components that they are mounted to. For instance, flexible elongated seals are often mounted to window and door frames with bends in the flexible elongated seal at the comers of the window or door frame. The second of the two important types of deformation that the flexible elongated seal can be subjected to is sectional deformation. For the purposes of this disclosure sectional deformation of the flexible elongated seal is defined to be deformation of its elongated body that causes one or more cross-sections of the elongated body perpendicular to its central axis to change in shape or size. Examples of sectional deformation of the flexible elongated seal would include crushing of its elongated body in directions perpendicular to its central axis and pushing or pulling of portions of its elongated body toward or away from one another. Different types of reinforcements for flexible elongated seals provide different degrees of stiffening against axial bending and sectional deformation. Reinforcements for flexible elongated seals have substantially the same mechanical properties along their entire central axis which extends in the same direction as the central axis of the elongated body of the flexible elongated seal that they reinforce. Some flexible elongated sealing components have multiple reinforcements embedded within their elongated bodies at different positions along their central axis. Each of the reinforcements of such flexible elongated seals that comprise multiple reinforcements have the same mechanical properties as the others. Thus for a given flexible elongated seal that comprises one or more reinforcements, those portions of its elongated body that are reinforced all have substantially the same stiffness properties. Flexible elongated sealing components are constructed with such uniform reinforcement in spite of the fact that different portions of a flexible elongated seal are often subjected to substantially different operating conditions and requirements. Therefore, many reusable formable elongated sealing components that have reinforcements are constructed in a manner such that the stiffness properties of some portions are compromised to accommodate the requirements of other sections of the flexible elongated seal.

SUMMARY

It is thus,—an object of the present invention to provide a flexible elongated seal that has different stiffness properties at different portions of the flexible elongated seal along its central axis. Such a flexible elongated seal may, thus, have the stiffness of different portions of its elongated body more appropriately tailored to the operating conditions that those different portions of the elongated body will be subjected to.

The flexible elongated seal of the present invention comprises an elongated body which, in turn, defines mounting features for mounting the flexible elongated seal to a component of an assembly. The elongated body of the flexible elongated seal is constructed primarily of a soft, flexible, durable material such as an elastomer. The flexible elongated seal of the present invention includes sealing features for sealing a gap between two or more adjacent components of the assembly to which the flexible elongated seal is mounted. The flexible elongated seal of the present invention has at least two reinforcements embedded in the soft, flexible, durable material of its elongated body. Each of the reinforcements of the flexible elongated seal of the reinforcements is oriented in the elongated body of the flexible elongated seal with a longitudinal axis of the reinforcement disposed substantially parallel to a central axis of the flexible elongated seal. Each of the reinforcements of the flexible elongated seal is also disposed at a different position along the central axis of the flexible elongated seal. At least one of the reinforcements of the flexible elongated seal of the present invention is of a different construction than the other reinforcement(s). The flexible elongated seal of the present invention has at least one wire mesh reinforcement and at least one rigid reinforcement. The wire mesh reinforcement of the flexible elongated seal is constructed of a wire like body that forms a number of coils each of which is disposed within a cross-section of the flexible elongated seal that is disposed substantially perpendicular to the central axis of the flexible elongated seal and also substantially perpendicular to a longitudinal axis of the wire mesh reinforcement. Each coil of the wire mesh reinforcement is connected to each adjacent coil by a section of the wire like body that extends in generally the same direction as the central axis of the flexible elongated seal and the longitudinal axis of the wire mesh reinforcement. The wire like body of the wire mesh reinforcement is constructed of a material that is relatively stiff in comparison to the soft, flexible, durable material that it is embedded in. Such a wire mesh reinforcement provides for the section of the flexible elongated seal within which it is embedded a considerable amount of stiffening against sectional deformation but a very limited amount of stiffening against axial bending. The wire mesh reinforcement provides substantial reinforcement against sectional deformation because adjacent coils of the wire mesh reinforcement act as springs in parallel when resisting sectional deformation. The wire mesh reinforcement provides relatively little stiffening against axial bending because adjacent coils of the wire mesh reinforcement and the sections of wire like body that connect adjacent coils act as springs in parallel when resisting axial bending. Use of such a wire mesh reinforcement is appropriate for portions of the flexible elongated seal that need reinforcement against sectional deformation but also need to be somewhat flexible in axial bending to allow the flexible elongated seal to be mounted to a component with bends or curves in that respective portion. The flexible elongated seal of the present invention also includes a rigid reinforcement. The rigid reinforcement of the flexible elongated seal is a member that extends in a continuous manner along its straight longitudinal axis. The rigid reinforcement is constructed of a material that is relatively stiff in comparison to the soft, flexible, durable material of the elongated body within which the rigid reinforcement is embedded. The rigid reinforcement is embedded in the elongated body of the flexible elongated seal in such an orientation that the longitudinal axis of the rigid reinforcement is oriented substantially parallel to the central axis of the flexible elongated seal. The construction of the rigid reinforcement is such that substantially all of its cross-sections perpendicular to its longitudinal axis have a relatively substantial moment of inertia about all axes perpendicular to its longitudinal axis. Thus, the rigid reinforcement, and the portion of the flexible elongated seal within which the rigid reinforcement is embedded, are substantially stiffer against axial bending than are the wire mesh reinforcement and the portion of the flexible elongated seal within which the wire mesh reinforcement is embedded. Because the rigid reinforcement is constructed of a material that is relatively stiff as compared to the soft, flexible, durable material of the elongate member of the window glass seal, the rigid reinforcement also provides substantial stiffening against sectional deformation of the portion of the flexible elongated seal within which the rigid reinforcement is embedded. A flexible elongated seal that has a portion of its elongated body reinforced by such a rigid reinforcement is well suited for applications in which it is important that a portion of the flexible elongated seal maintain a straight shape.

Thus, it can be seen that the above-mentioned object of the invention as well as others not mentioned have been met.

DRAWINGS

Other objects and advantages of the invention will become more apparent upon perusal of the detailed description thereof and upon inspection of the drawings in which.

DETAILS OF INVENTION

Figure 1:
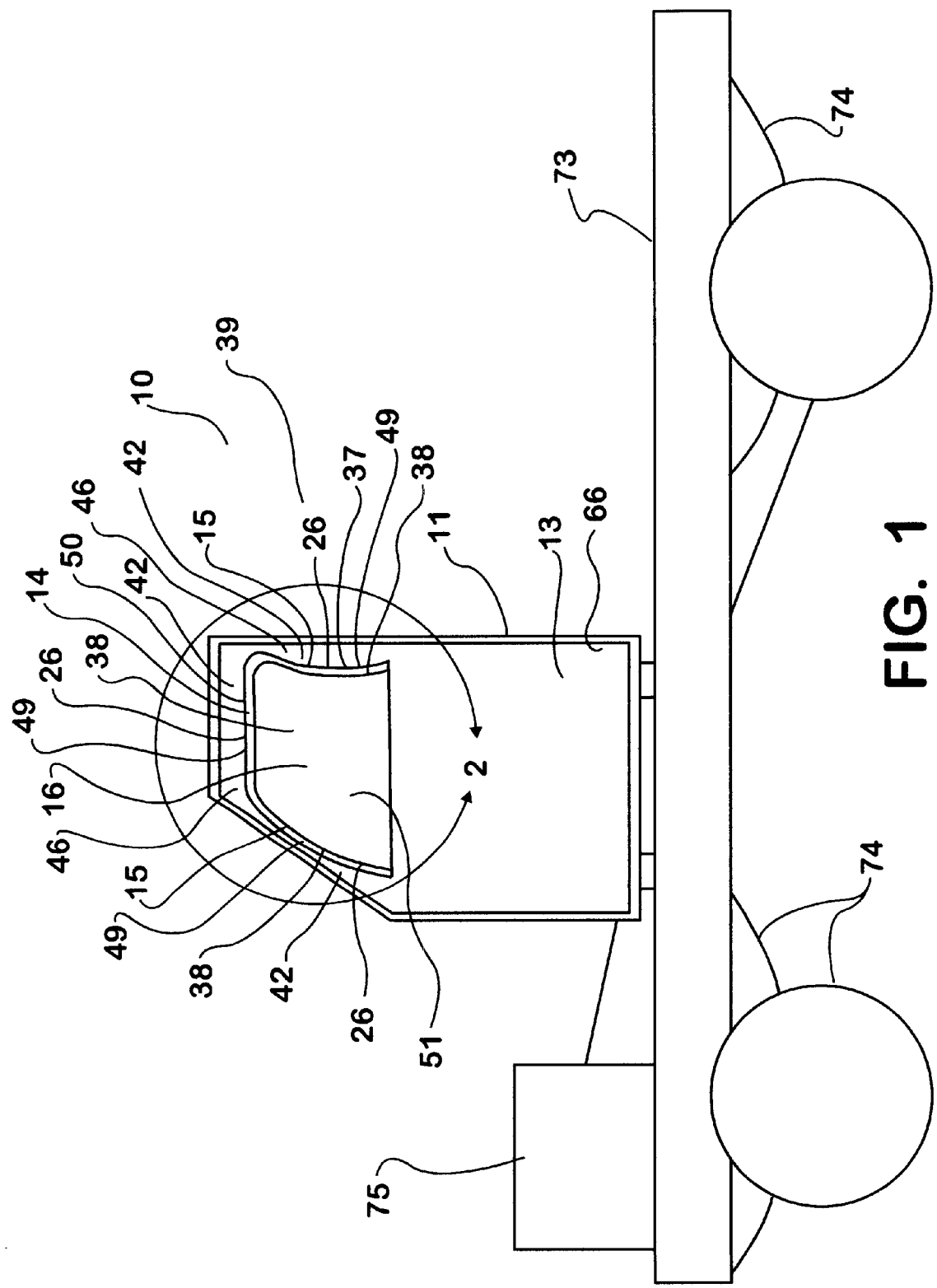
FIG. 1 is a side view of a vehicle with the flexible elongated seal of the present invention mounted to a window frame of the occupant cabin.
Figure 2:
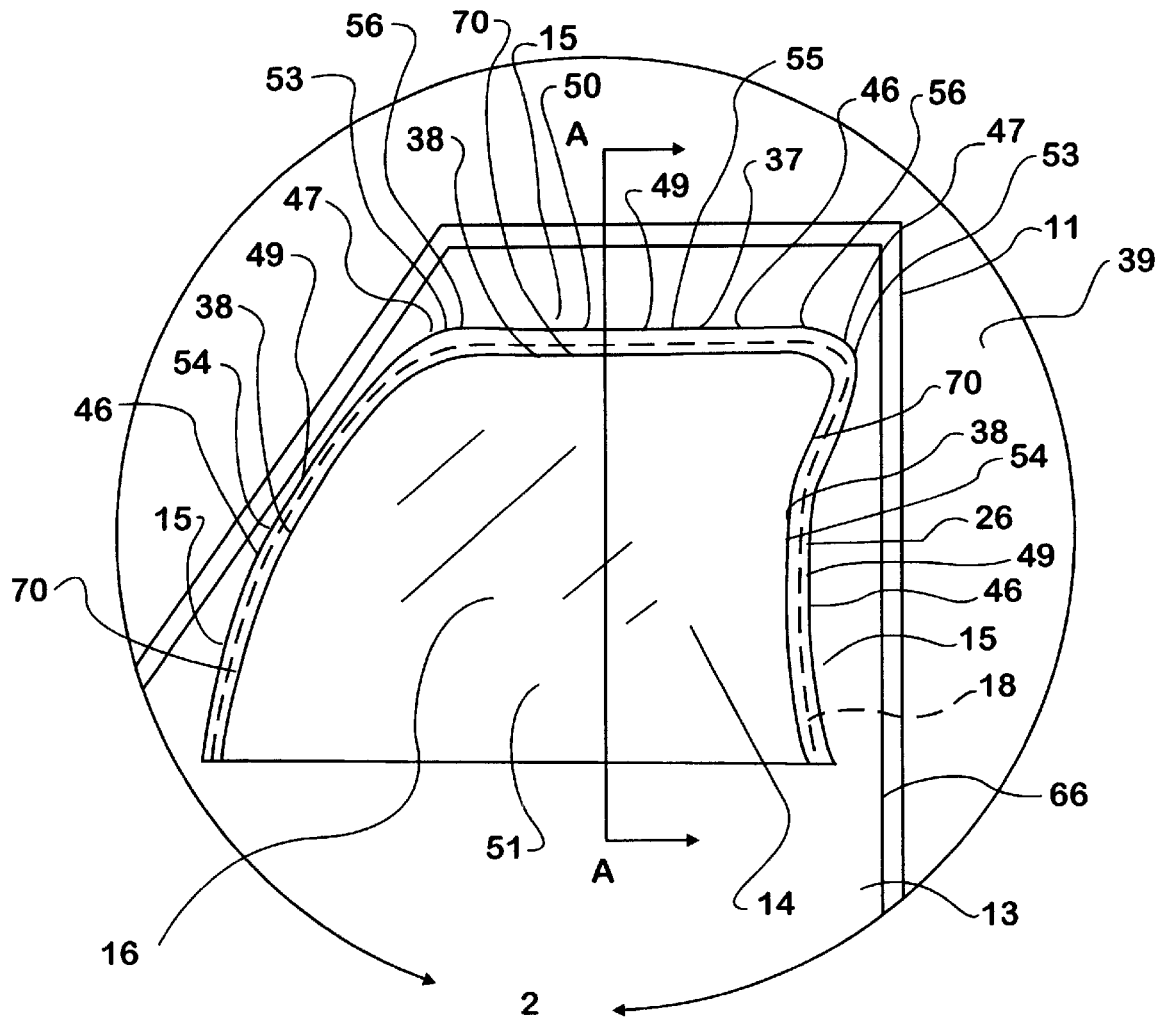
FIG. 2 is a enlarged view of the portion of FIG. 1 in circle 2 showing the flexible elongated seal mounted to the window frame of an occupant cabin of a vehicle.
Figure 3:
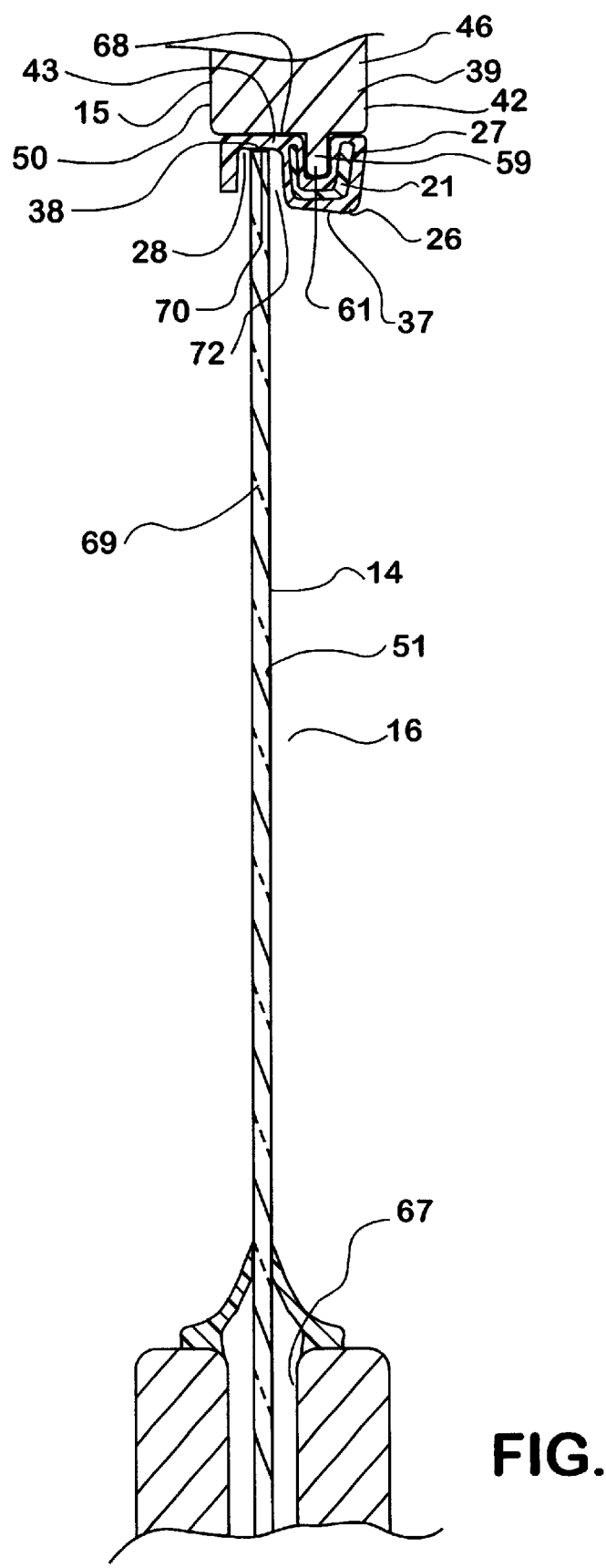
FIG. 3 is a sectional view of the occupant cabin shown in FIG. 2 through line A—A of FIG. 2 and with the window glass of the occupant cabin in a closed position.
Figure 4:
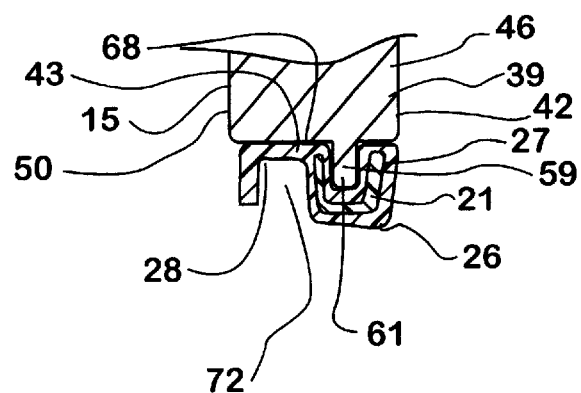
FIG. 4 is a sectional view of the occupant cabin shown in FIG. 2 through line A—A of FIG. 2 and with the window glass of the occupant cabin in an open position.
Figure 4:
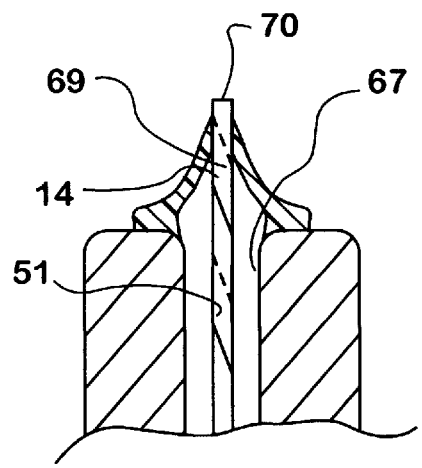
Figure 5:
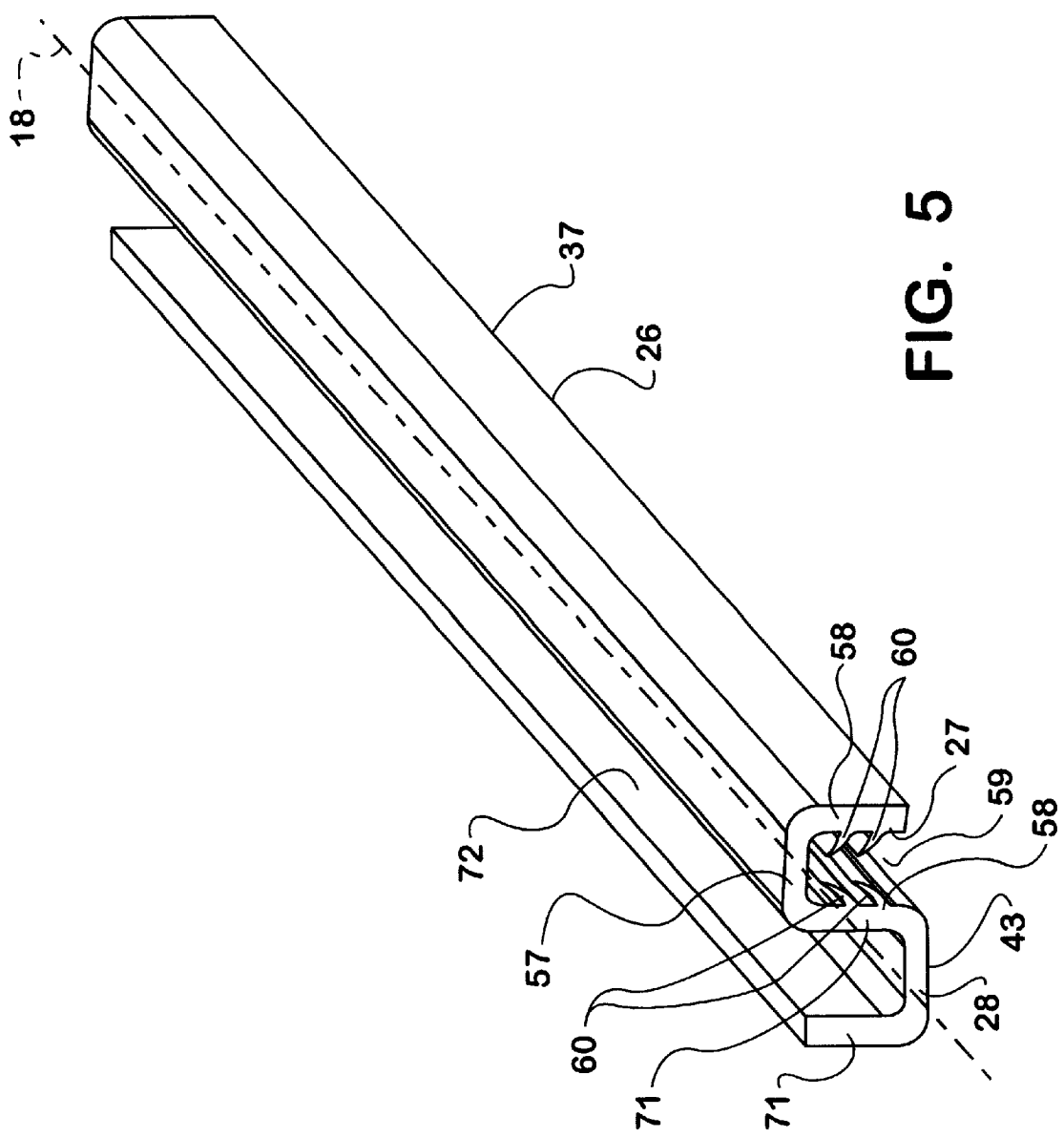
FIG. 5 is a perspective view of a flexible elongated seal according to the invention.
Figure 6:
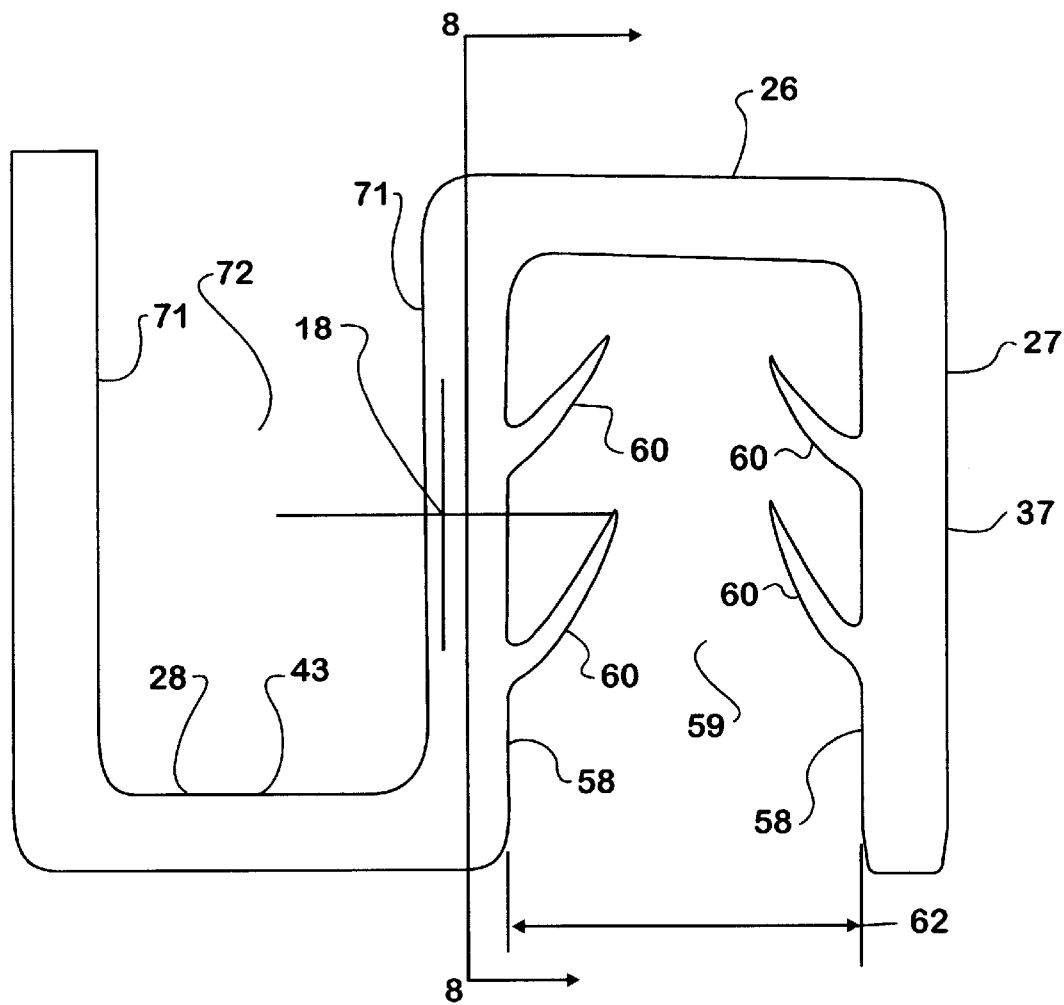
FIG. 6 is an end view of a flexible elongated seal according to the invention.
Figure 7:
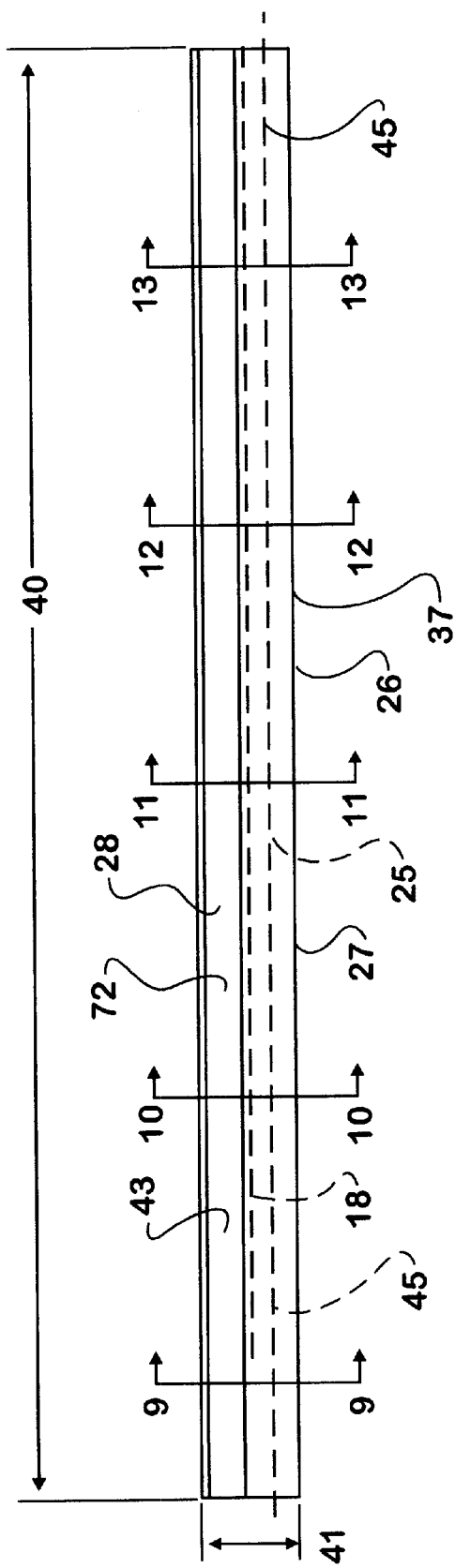
FIG. 7 is a plan view of a flexible elongated seal according to the invention.
Figure 8:
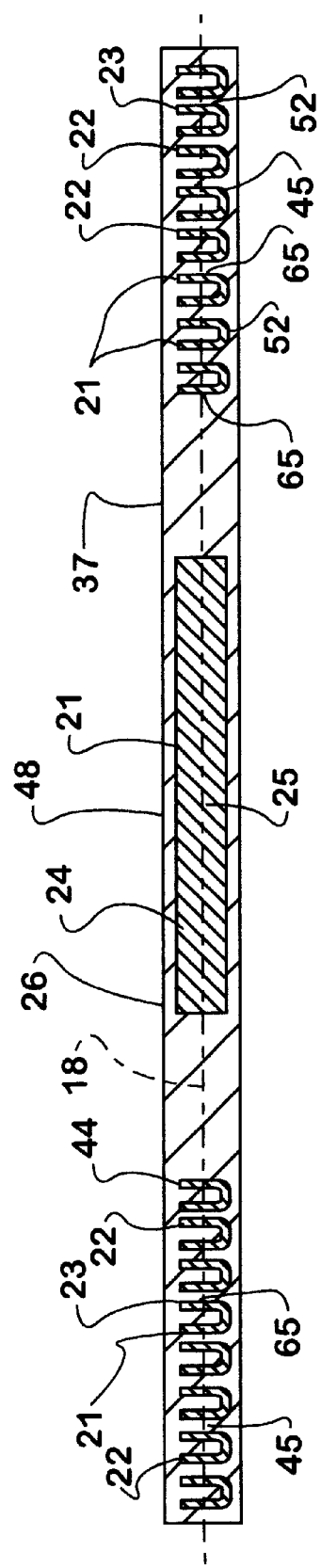
FIG. 8 is a sectional view through line 8—8 of FIG. 6 of a flexible elongated seal according to the invention, showing one distribution of reinforcements along the length of the flexible elongated seal.
Figure 9:
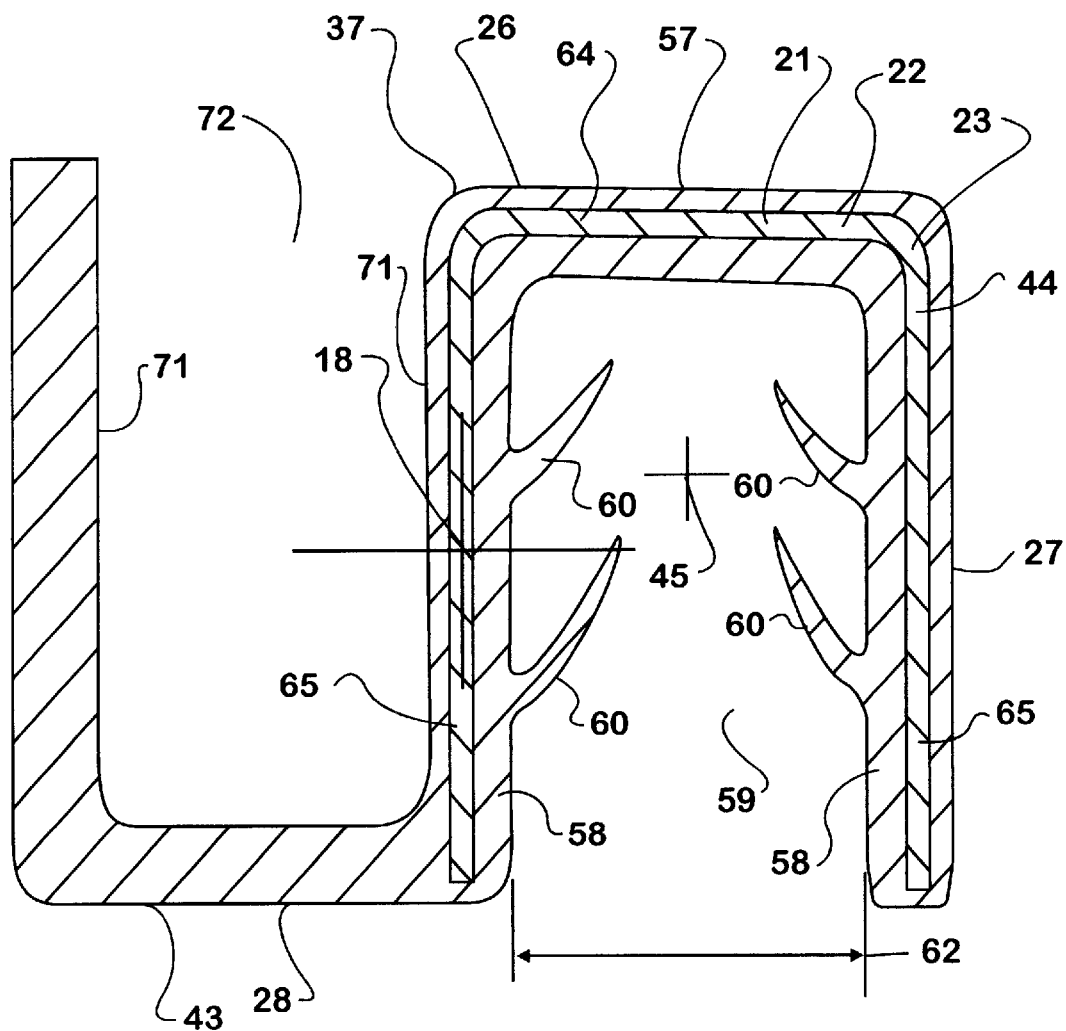
FIG. 9 is a sectional view through line 9—9 of FIG. 7 of a flexible elongated seal of the invention, showing a portion of the flexible elongated seal within which the first wire mesh reinforcement is embedded.
Figure 10:
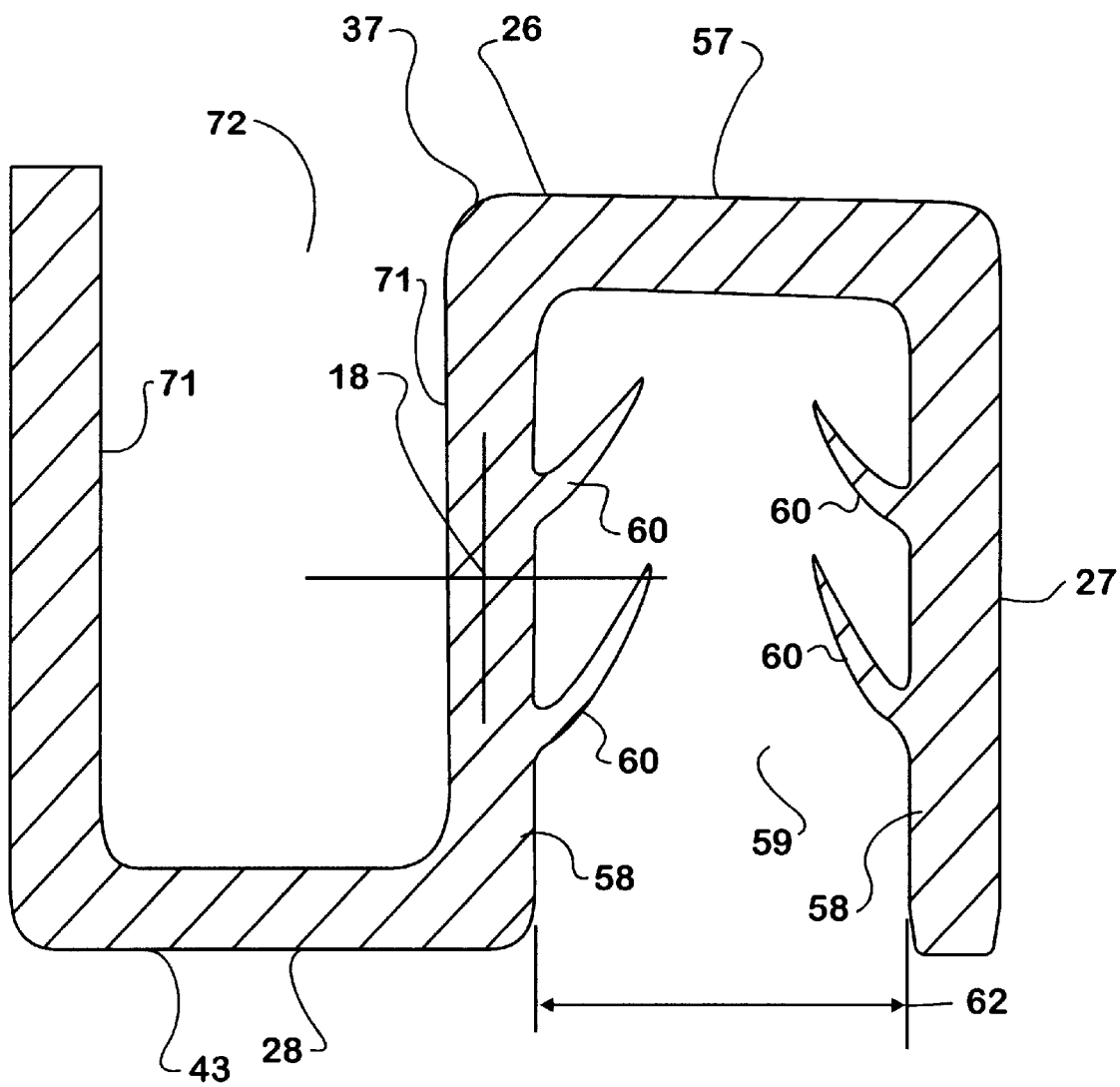
FIG. 10 is a sectional view through line 10—10 of FIG. 7 of the flexible elongated seal of the preferred embodiment, showing the unreinforced portion of the elongated seal between the first wire mesh reinforcement and the rigid reinforcement.
Figure 11:
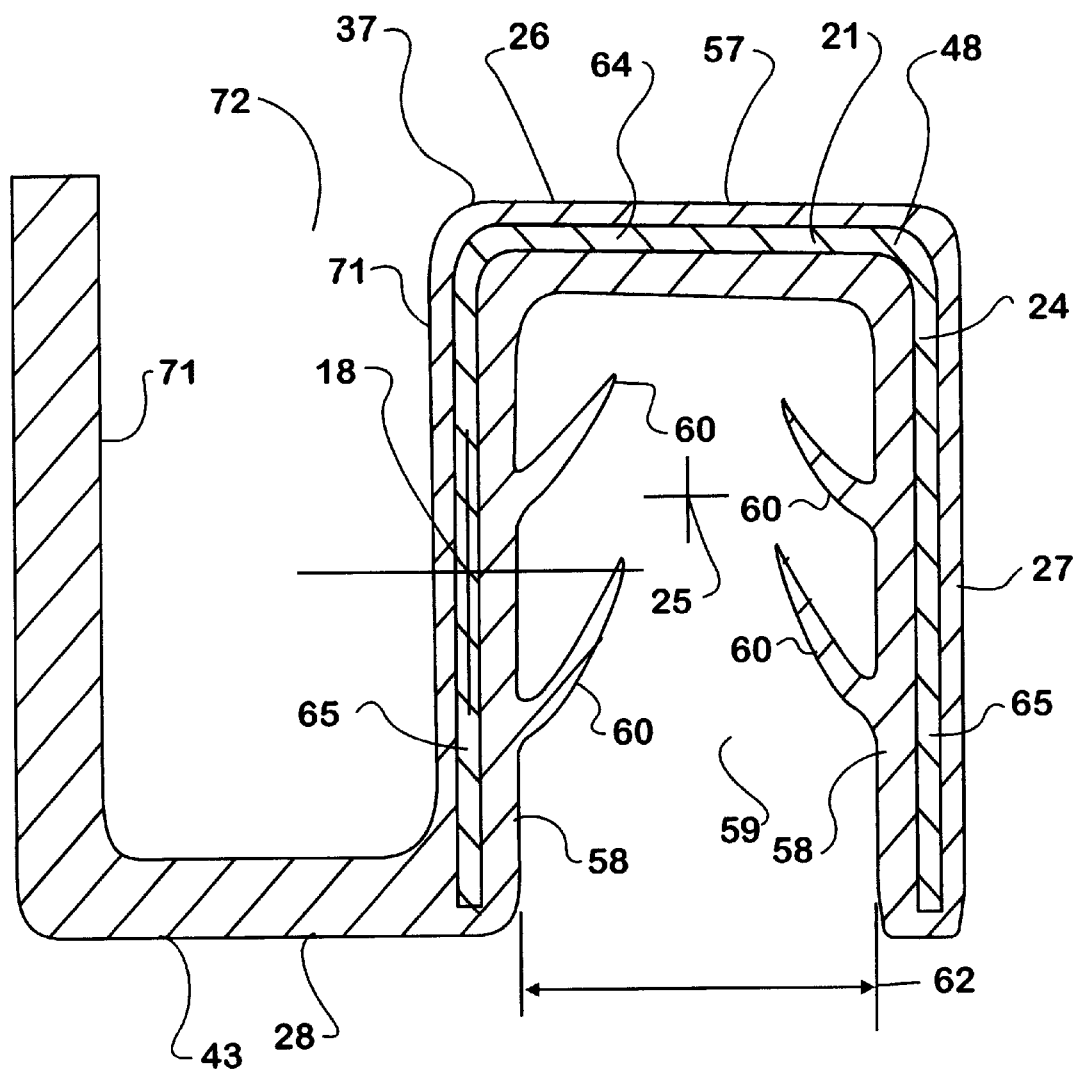
FIG. 11 is a sectional view through line 11—11 of FIG. 7 of the flexible elongated seal of the preferred embodiment, showing a portion of the flexible elongated seal within which the rigid reinforcement is embedded.
Figure 12:
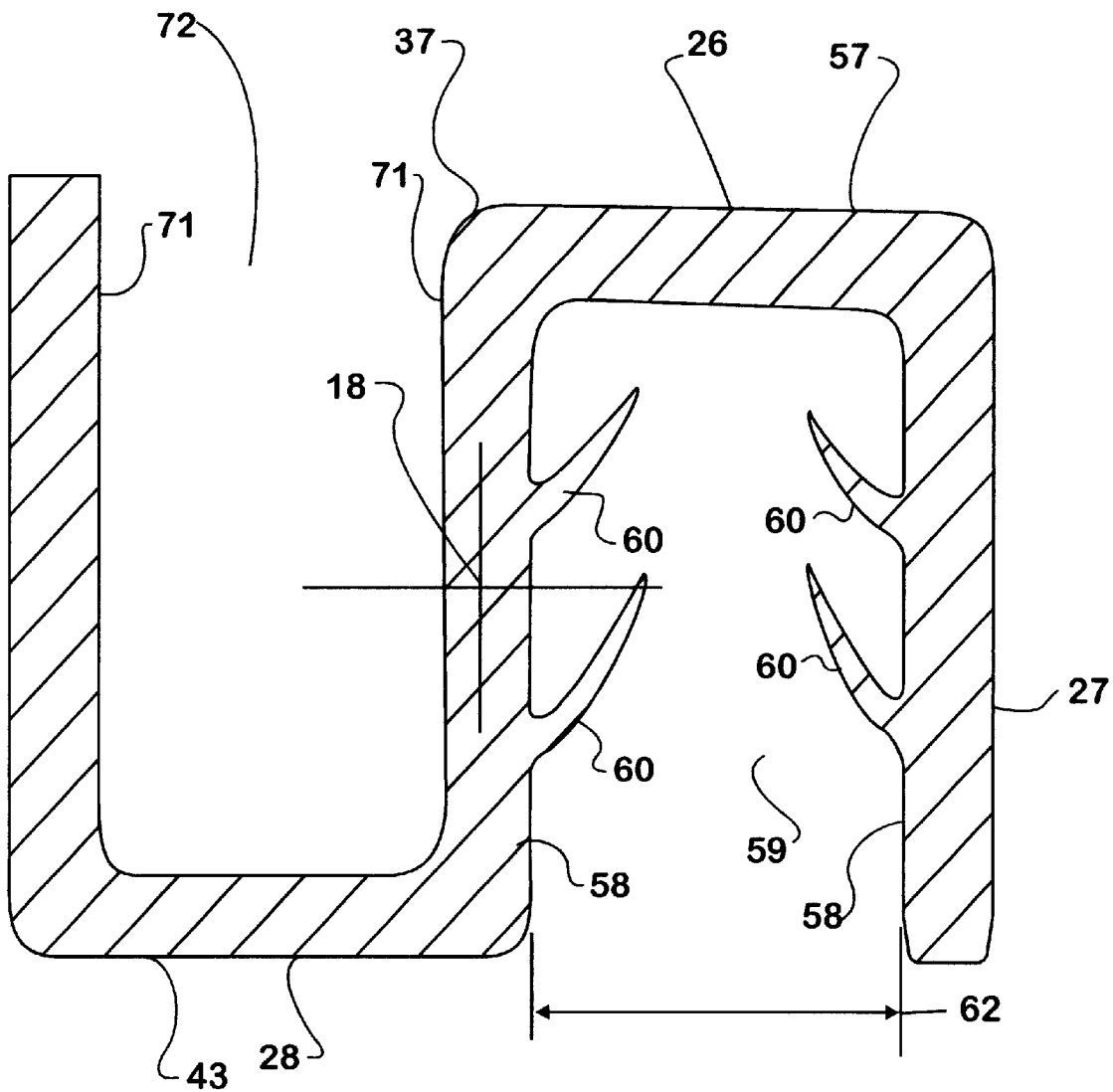
FIG. 12 is a sectional view through line 12—12 of FIG. 7 of the flexible elongated seal of the preferred embodiment, showing the unreinforced portion of the elongated seal between the rigid reinforcement and the second wire mesh reinforcement.
Figure 13:
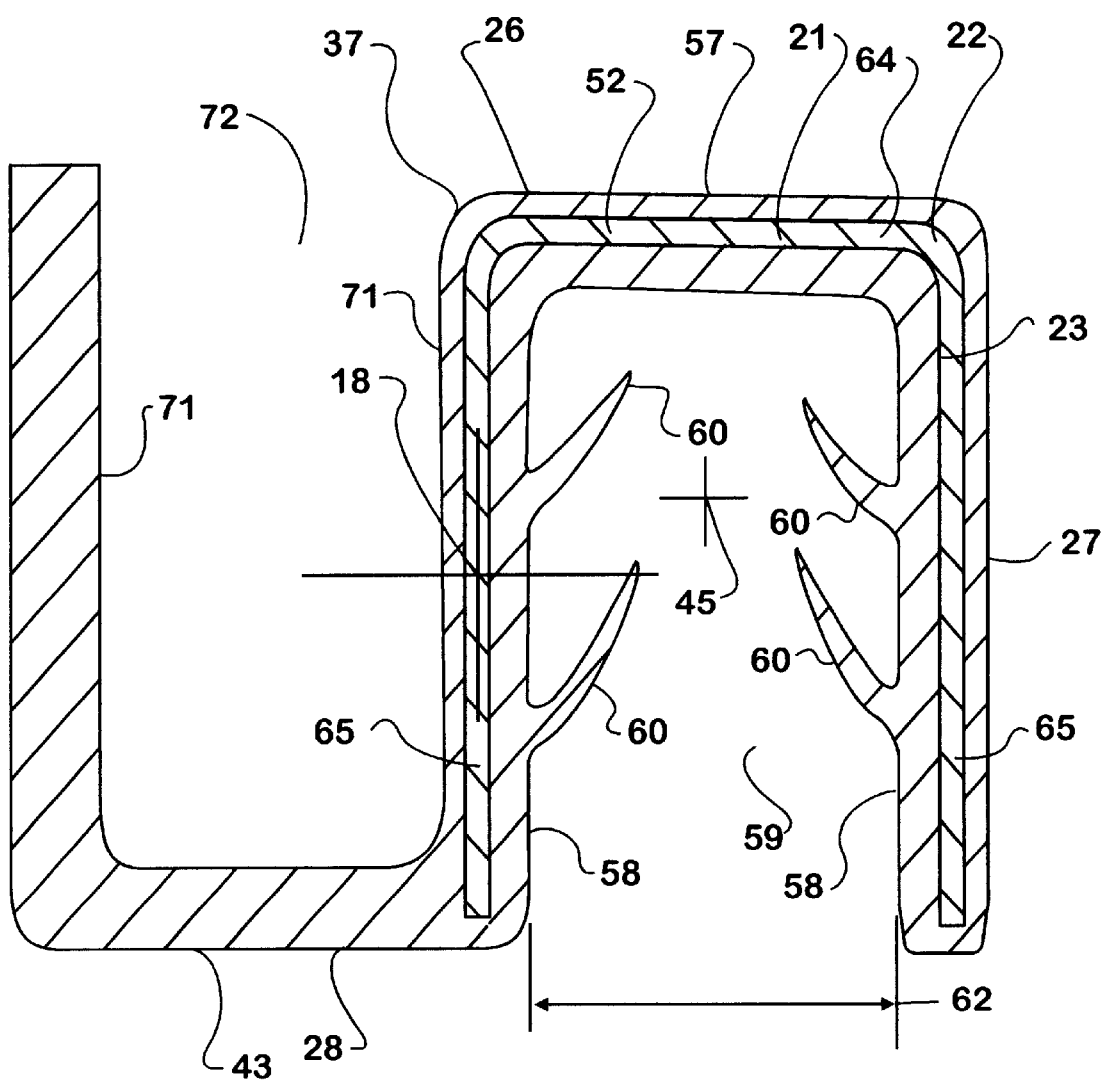
FIG. 13 is a sectional view through line 13—13 of FIG. 7 of the flexible elongated seal of the preferred embodiment, showing a portion of the flexible elongated seal within which the second wire mesh reinforcement is embedded.
Figure 14:
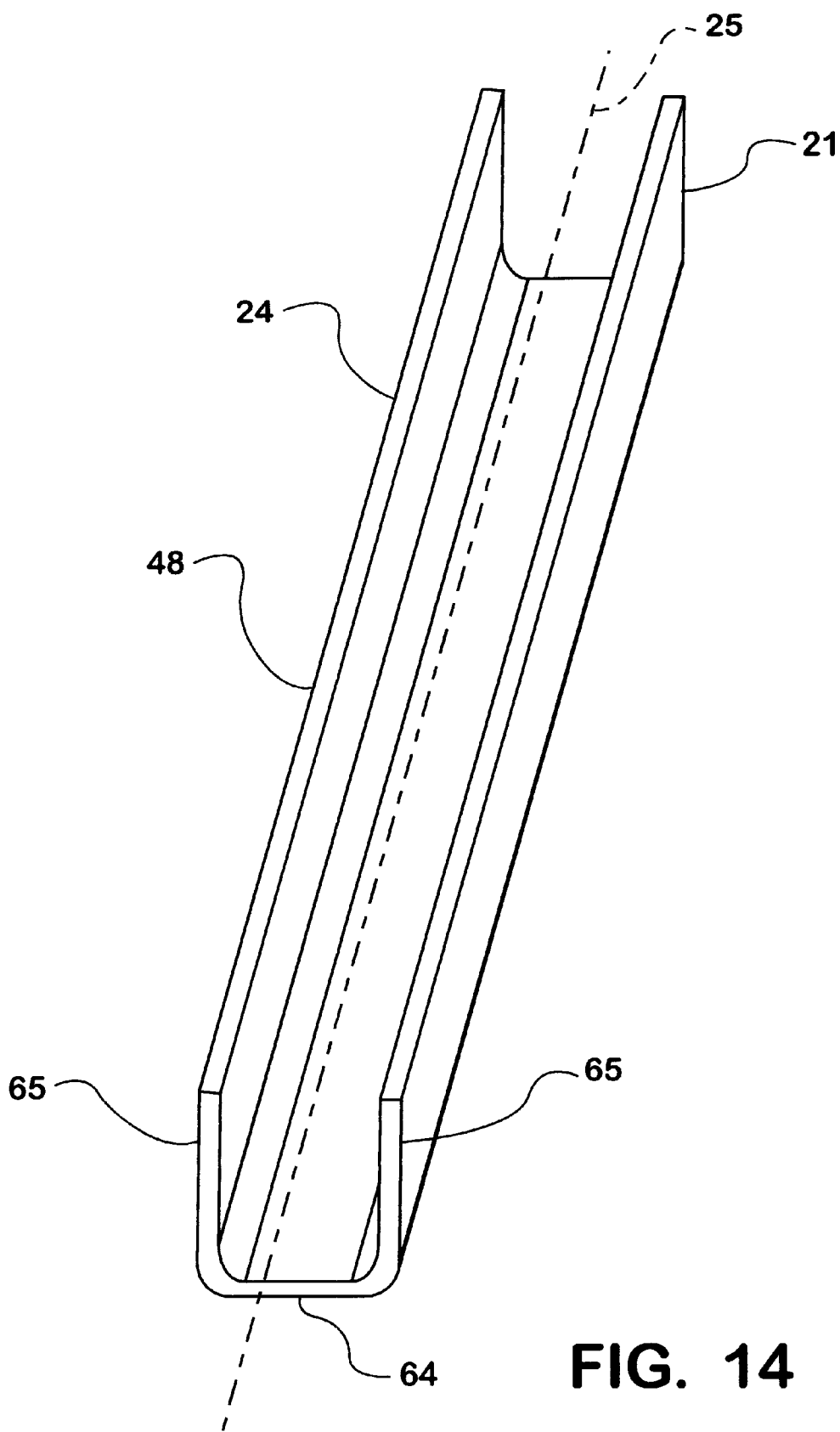
FIG. 14 is a perspective view of a rigid reinforcement according to the invention.
Figure 15:
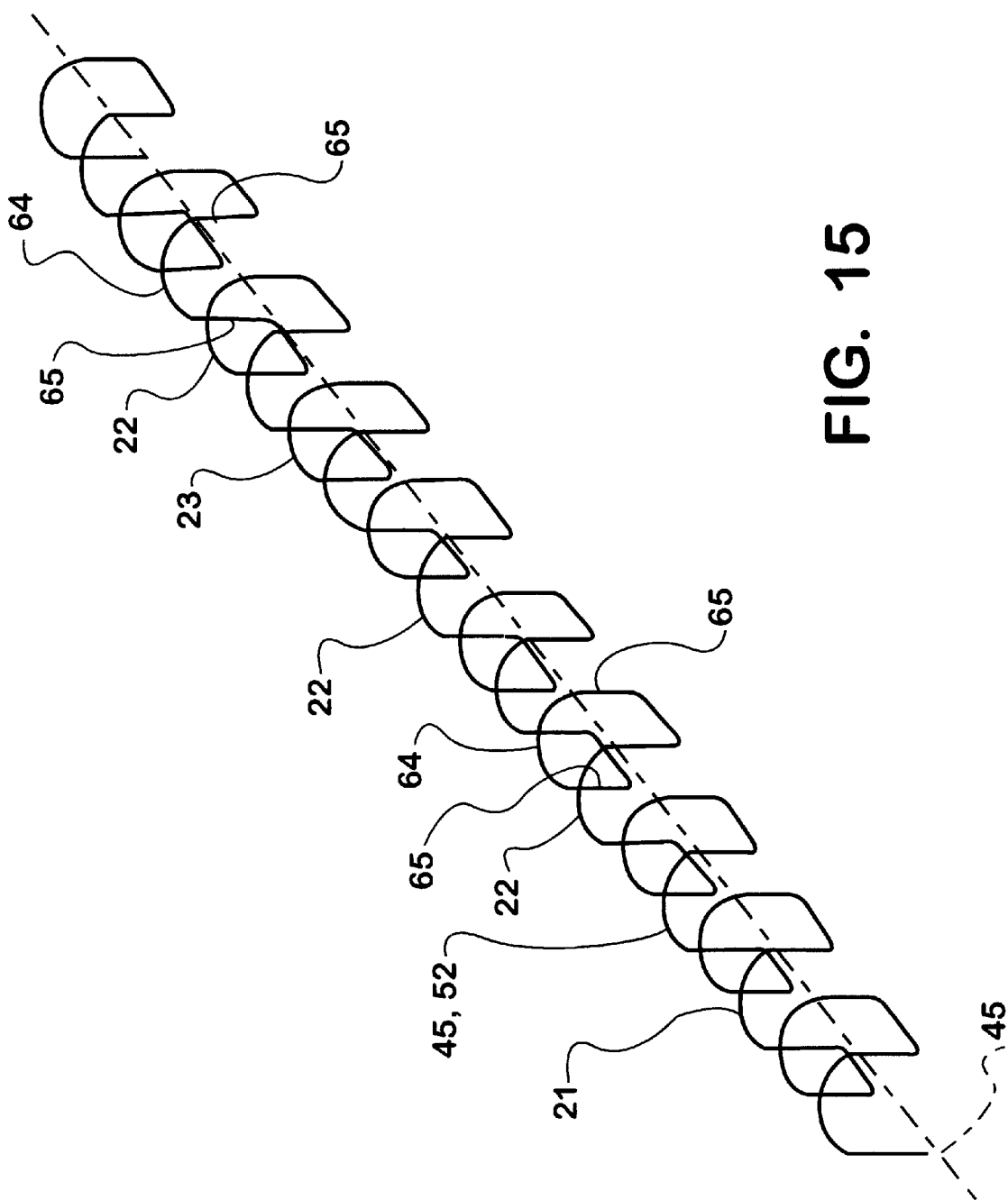
FIG. 15 is a perspective view of a wire mesh reinforcement according to the invention.

The present invention is a flexible elongated seal 37 for sealing a gap 38 between two or more components that are disposed adjacent one another. The flexible elongated seal 37 comprises an elongated body 26 that has a central axis 18 that extends along the length of the elongated body 26. The elongated body 26 of the elongated flexible seal 37 has a length 40 that is many times greater than the largest sectional width 41 of the elongated body 26. For purposes of this disclosure a sectional width 41 of the elongated body 26 is a width of the elongated body 26 in any direction perpendicular to the central axis 18 of the elongated body 26 and at any point along the central axis 18 of the elongated body 26. The elongated body 26 of the flexible elongated seal 37 is constructed primarily of a soft, flexible, durable material such as an elastomer. The elongated body 26 may be constructed primarily of any of a number of types of elastomers, plastics, or any other material that is soft, flexible, and durable.

The elongated body 26 of the flexible elongated seal 37 of the present invention defines mounting features 27 that facilitates mounting of the flexible elongated seal 37 to a seal mounting component 42 of an assembly 39. The most advantageous design of the mounting features 27 of a particular flexible elongated seal 37 are highly dependent upon the design of the assembly 39 to which the flexible elongated seal 37 is mounted. The flexible elongated seal 37 of the present invention may be used with assemblies 39 of many different designs. For these reasons the mounting features 27 of the flexible elongated seal 37 of the present invention may be any of a number of well known types of mounting features 27 for such seals. The mounting features 27 of such flexible elongated seals 37 generally comprises some combination of flanges, lips, tabs, ribs, bosses, channels, and/or recesses defined by the elongated body 26 of the flexible elongated seal 37. The mounting features 27 of an elongated seal 37 interact with the structure of a seal mounting component 42 and in some cases with other components such as fasteners to maintain proper attachment of the flexible elongated seal 37 to the seal mounting component 42.

The elongated body 26 of the flexible elongated seal 37 also comprises sealing features 28 that fill a gap 38 between two or more adjacent components of an assembly 39. The most advantageous design of the sealing features 28 of a particular flexible elongated seal 37 are largely dependent upon the details of the design of the assembly 39 that defines the gap 38 that the sealing features 28 are intended to fill and seal. The flexible elongated seal 37 of the present invention may be used to seal gaps 38 defined by assemblies 39 of many different designs. For these reasons the sealing features 28 of the flexible elongated seal 37 of the present invention may have any of a number of well known designs for sealing features 28 of flexible elongated seals 37. Generally the sealing features 28 of the flexible elongated seal 37 may comprise some combination of lips, ribs, flaps, walls, and channels defined by the elongated body 26 of the flexible elongated seal 37. The sealing features 28 of the flexible elongate seal 37 comprise a gap bridge 43 that may be of many different designs. The gap bridge 43 is structure defined by the elongated body 26 of the flexible elongated seal 37. The construction of the elongated body 26 is such that, when the components of the assembly 39 are disposed in such a position that the gap 38, that the sealing features 28 are intended to fill and seal, exists, the gap bridge 43 is disposed within, substantially fills and seals the gap 38. As is alluded to above, the components of the assembly 39 to which the flexible elongated seal 37 is mounted may not always be in a position such that the gap 38, that the sealing features 28 are intended to seal exists. For example, if the flexible elongated seal 37 were mounted to a door in order to seal a gap between the door and a corresponding door frame when the door is in its closed position, and the door were in its open position, the gap that the flexible elongated seal 37 was intended to seal would not exist until the door were closed.

The flexible elongated seal 37 includes at least two reinforcements embedded in its elongated body 26. Reinforcements 21 of flexible elongated seals are generally constructed primarily to stiffen the flexible elongated seal 37 against one or both of two important types of deformation that the flexible elongated seal 37 can be subjected to. A first of these two types of deformation that can occur to the flexible elongated seal 37 is axial bending. For the purposes of this disclosure axial bending of the flexible elongated seal 37 is defined to be bending of the elongated body 26 of the flexible elongated seal 26 along its central axis 18. The second of the two important types of deformation that the flexible elongated seal 37 can be subjected to is sectional deformation. For the purposes of this disclosure sectional deformation of the flexible elongated seal 37 is defined to be deformation of its elongated body 26 that causes one or more cross-sections of the elongated body 26 perpendicular to its central axis 18 to change in shape or size. Examples of sectional deformation of the flexible elongated seal 37 would include crushing of its elongated body 26 in directions perpendicular to its central axis 18 and pushing or pulling of portions of its elongated body 26 toward or away from one another.

At least one of the reinforcements 21 of the flexible elongated seal 37 is a first wire mesh reinforcement 44. Each of the first wire mesh reinforcement 44 of the flexible elongated seal 37 is constructed of a wire like body 23. The wire like body 23 of the first wire mesh reinforcement 44 is constructed of a material that is relatively stiff compared to the soft, flexible, durable material that the first wire mesh reinforcement 44 is embedded in. The wire like body 23 of the first wire mesh reinforcement 44 forms a plurality of coils 22 disposed adjacent to one another along a longitudinal axis 45 of the first wire mesh reinforcement 44. Each coil 22 is disposed within a cross-section of the elongated body 26 that is disposed substantially perpendicular to the central axis 18 of the elongated body 26. Each coil 22 of the first wire mesh reinforcement 44 is connected to adjacent coils 22 by a section of the wire like body 23 that extends between the coils 22 in a direction parallel to the longitudinal axis 45 of the first wire mesh reinforcement 44. Each of the coils 22 of the first wire mesh reinforcement 44 may have any of a number of shapes appropriate for providing reinforcement for the elongated body 26 of the flexible elongated seal 37. Generally, however, the coils 22 of a wire mesh reinforcement 44 are shaped such that they may be entirely embedded within the elongated body 26. Additionally, all of the coils of a particular wire mesh reinforcement 44 usually have the same shape. The first wire mesh reinforcement 44 of the flexible elongated seal 37 is embedded in the elongated body 26 in such an orientation that the longitudinal axis 45 of the first wire mesh reinforcement 44 is oriented substantially parallel to the central axis 18 of the elongated body 26. When a section of the elongated body 26, within which a wire mesh reinforcement 44 is embedded, is subjected to forces that would tend to cause sectional deformation of the elongated body, adjacent coils 22 of the wire mesh reinforcement act as springs in parallel and resist such sectional deformation of that respective portion of the elongated body 26. For this reason, any sections of the elongated body 26 within which a wire mesh reinforcement 44 is embedded, are substantially reinforced against sectional deformation by the wire mesh reinforcement 44 embedded therein. When a section of the elongated body 26, within which a wire mesh reinforcement 44 is embedded, is subjected to moments that would tend to cause axial bending of the elongated body 26, adjacent coils 22 of the wire mesh reinforcement 44 and the sections of the wire like body 23 that connect them, act as springs in series to resist the axial bending of the elongated body 26. Thus, sections of the elongated body 26 within which wire mesh reinforcements 44 are embedded, are reinforced to some degree against axial bending, but they can still be relatively easily bent along the central axis 18 of the elongated body 26. For many applications it is desirable that certain portions of the elongated body 26 of flexible elongated seal 37 be relatively stiff against sectional deformation and have at least some flexibility in axial bending. There are numerous possible reasons that it would be desirable for a section of the elongated body 26 of the flexible elongated seal 37 to be relatively stiff against sectional deformation. One important reason that it is desirable that a section of the flexible elongated seal 37 be relatively flexible in axial bending is that it may be desirable to mount the flexible elongated seal 37 to a seal mounting component 42 with a bend in that portion of the flexible elongated seal 37. For instance, flexible elongated seals 37 are often mounted to the perimeter of window frames 46. A flexible elongated seal 37 mounted to a window frame 46 in such a manner, must be bent along its central axis 18 adjacent the corners 47 of the window frame 46.

The flexible elongated seal 37 of the present invention further includes at least one rigid reinforcement 24 embedded in its elongated body 26. The rigid reinforcement 24 is embedded in the elongated body 26 of the flexible elongated seal at a different position along the central axis 18 of the elongated body 26 than the first wire mesh reinforcement 44. The rigid reinforcement 24 comprises a member 48 that extends continuously along a longitudinal axis 25 of the rigid reinforcement 24. The member 48 of the rigid reinforcement 24 is constructed of a material that is relatively stiff in comparison to the soft, flexible, durable material of the elongated body 26 within which the rigid reinforcement 24 is embedded. The rigid reinforcement 24 is constructed in such a manner that substantially all of its cross-sections perpendicular to it longitudinal axis 25 have a relatively substantial moment of inertia about any axis perpendicular to the longitudinal axis 25 of the rigid reinforcement 24. A person of ordinary skill in the art could easily imagine innumerable designs of rigid reinforcements 24 that would have the aforementioned mechanical properties of the rigid reinforcement 24 of the present invention. The rigid reinforcement 24 is embedded in the elongated body 26 in such an orientation that the longitudinal axis 25 of the rigid reinforcement 24 is disposed substantially parallel to the central axis 18 of the elongated body 26. Sections of the elongated body 26 within which a rigid reinforcement 24 is embedded are substantially stiffened against sectional deformation and are stiffened to much greater degree against axial bending. In fact, sections of the elongated body 26 that are reinforced with a rigid reinforcement 24, generally cannot be bent along the central axis 18 of the elongated body 26 to any substantial degree without plastically deforming the rigid reinforcement 24 embedded within the respective section of the elongated body 26. Flexible elongated seals 37 that have a portion of their elongated body 26 reinforced with a rigid reinforcement 24 are advantageous for applications where that portion of the elongated body 26 is supposed to be straight and will be subjected to bending moments about its central axis 18 when it is in service. For example, the perimeter 49 of a window frame 46, to which a flexible elongated seal 37 is mounted, may have an upper section 50 that is straight. In such an application it would be advantageous to reinforce the portion of the flexible elongated seal 37 that is mounted to the straight upper section 50 of the window frame 46 with a rigid reinforcement 24 to help prevent that portion of the flexible elongated seal 37 from sagging.

A flexible elongated seal 37 according to the present invention may be utilized in numerous different types of assemblies 39. In the preferred embodiment, the flexible elongated seal 37 of the present invention is utilized to seal a gap 38 between a window frame 46 and a window 51 when the window 51 is in a closed position. In this embodiment, the flexible elongated seal 37, which could be mounted to either the window 51 or the window frame 46, is preferably mounted to the window frame 46. The flexible elongated seal 37 of the preferred embodiment has different types of reinforcements 21 at different positions along its central axis 18. Partially due to the particular distribution of different types of reinforcements 21 along its central axis 18, the flexible elongated seal 37 of the preferred embodiment is particularly well suited for mounting to a window frame 46. As was mentioned above the flexible elongated seal 37 of the preferred embodiment has a first wire mesh reinforcement 44 and a rigid reinforcement 24 embedded within its elongated body 26 at different positions along its central axis 18. Additionally, the flexible elongated seal 37 of the preferred embodiment has a second wire mesh reinforcement 52 embedded in its elongated body 26. The second wire mesh reinforcement 52 is of a construction similar to the first wire mesh reinforcement 44. Minor differences such as differences in spacing between coils 22, differences in size of the wire like body 23, differences in the shape of coils 22, and differences in material of construction may exist between the construction of the first wire mesh reinforcement 44 and the second wire mesh reinforcement 52. The second wire mesh reinforcement 52 of the flexible elongated seal 37 is preferably embedded in the elongated body 26 at a position such that the rigid reinforcement 24 is disposed between it and the first wire mesh reinforcement 44 along the central axis 18 of the elongated body 26. The elongated body 26 also preferably includes relatively short portions, between the first wire mesh reinforcement 44 and the rigid reinforcement 24 and between the rigid reinforcement 24 and the second wire mesh reinforcement 52, within which no reinforcements 21 are embedded.

The flexible elongated seal 37 of the preferred embodiment, constructed in such a manner, is particularly well suited for mounting to the perimeter of any of the following components—a window frame 46, a door frame, a window 51, or a door 13. In the preferred embodiment, the flexible elongated seal 37 is constructed to be mounted to the perimeter 49 of a window frame 46 that has a straight portion 55 disposed between two corner portions 53 that have a small radius of curvature and two relatively gently curving portions 54 that are disposed upon opposite sides of the corner portions 53 from the straight portion 55. Preferably, the flexible elongated seal 37 is mounted to the perimeter 49 of such a window frame 46 with the rigid reinforcement 24 disposed adjacent the straight portion 50 of the perimeter 49 of the window frame 46 The first wire mesh reinforcement 44 is disposed adjacent one of the gently curving portions 54 of the perimeter 49 of the window frame 46 and the second wire mesh reinforcement 52 is disposed adjacent the other of the gently curving portions 54 of the perimeter 49 of the window frame 46. The portions of the elongated body 26 that are between the rigid reinforcement 24 and the wire mesh reinforcements 44, 52 are mounted adjacent the corner portions 53 of the perimeter 49 of the window frame 46 that have a small radius of curvature. Because they have no reinforcements 21, those portions of the flexible elongated seal 37 that are mounted adjacent the corner portions 53 of the perimeter 49 of the window frame 46 can be readily bent along the central axis 18 of the elongated body 26 to conform to the small radius of curvature of the corner portions 53. Those portions of the flexible elongated seal 37 that have wire mesh reinforcements 44, 52 are substantially reinforced against sectional deformation yet are flexible enough in axial bending to conform to the gently curving portions 54 of the perimeter 49 of the window frame 46. The portion of the flexible elongated seal 37 disposed adjacent the straight portion 55 of the perimeter 49 of the window frame 46 obviously need not have much flexibility in axial bending. In fact it may be, as is the case in the preferred embodiment, desirable that the portion of the flexible elongated seal 37 disposed adjacent the straight portion 55 of the perimeter 49 of the window frame 46 be very stiff against axial bending. There are a great number of possible reasons that it may be preferable that this section of the flexible elongated seal 37 be very stiff against axial bending. In the preferred embodiment there are at least two advantages derived from utilizing a rigid reinforcement 24 in the portion of the flexible elongated seal 37 disposed adjacent the straight portion 55 of the perimeter 49 of the window frame 46. In the preferred embodiment the portion of the perimeter 49 of the window frame 46 adjacent which the portion of the flexible elongated seal 37 that includes the rigid reinforcement 24 is disposed is an upper section 50 of the perimeter 49 of the window frame 46. The portion of the flexible elongated seal 37 that includes the rigid reinforcement 24 is suspended from and below this upper section 50 of the perimeter 49 of the window frame 46. The rigid reinforcement 24 helps prevent the flexible elongated seal 37 from sagging away from the upper section 50 of the perimeter 49 of the window frame 46. In the preferred embodiment, the rigid reinforcement 24 also facilitates the mounting of the of the flexible elongated seal 37 with its various portions along its central axis 18 properly located relative to the various portions of the perimeter 49 of the window frame 46. In the preferred embodiment, the rigid reinforcement 24 of the flexible elongated seal 37 has a length that is very similar to the length of the straight portion 55 of the perimeter 49 of the window frame 46 adjacent which the portion of the flexible elongated seal 37 that has the rigid reinforcement 24 is to be mounted. In addition, it would be relatively difficult to mount the flexible elongated seal 37 to the perimeter 49 of the window frame 46 with any substantial portion of the rigid reinforcement 24 extending past the ends 56 of the straight portion 55 of the perimeter 49 of the window frame 46. Thus, in the preferred embodiment, correct alignment of various portions of the flexible elongated seal 37 to various portions of the window frame 46 is facilitated because there is so little margin of error in the positioning of the rigid reinforcement 24 relative to the straight portion 55 of the perimeter 49 of the window frame 46.

As mentioned above, the mounting features 27 of the flexible elongated seal 37 may have any one of a large number of well known designs. In the preferred embodiment, the elongated body 26 defines a mounting structure base wall 57 that extends a short distance perpendicular to the longitudinal axis 18 of the elongated body 26 along substantially the entire length of the central axis 18 of the elongated body 26. In the preferred embodiment, the elongated body 26 also defines two mounting structure side walls 58 that extend from the mounting structure base wall 57. Each of the mounting structure side walls 58 extends a relatively short distance substantially perpendicularly from the mounting structure base wall 57 along substantially the entire length of the mounting structure base wall 58. A mounting channel 59 is defined between the two mounting structure side walls 58. The mounting channel 59 has a mounting channel width 62 which is a perpendicular distance between the mounting structure side walls 58. In the preferred embodiment, the elongated body 26 also defines gripper lips 60 that extend from the mounting structure side walls 58. Each gripper lip 60 is disposed upon a side of a mounting structure side wall 58 that faces the mounting structure channel 59. Each gripper lip 60 extends away from the mounting structure side wall 58 that it is engaged to and toward the mounting structure base wall 57 of the elongated body 26.

In the preferred embodiment, the seal mounting component 42 to which the flexible elongated seal 37 is to be mounted includes structure that is complimentary to the seal mounting features 27 of the elongated body 26 of the preferred embodiment. In the preferred embodiment, the seal mounting component 42 defines a seal mounting rib 61 that extends along a portion of an outer surface of the seal mounting component 42 adjacent which the flexible elongated seal 37 of the present invention is to be mounted. The seal mounting rib 61 has a mounting rib width 63. In the preferred embodiment, the mounting rib width 63 of the seal mounting rib 61 is somewhat greater than the mounting channel width 62 of the mounting channel 59 when the elongated body 26 is in its free state.

The flexible elongated seal 37 of the preferred embodiment is mounted to the seal mounting component 42 of the preferred embodiment by sliding the seal mounting rib 61 into the mounting channel 59 of the flexible elongated seal 37. Because the mounting rib width 63 is greater than the mounting channel width 62, when the elongated body 26 of the flexible elongated seal 37 is in its free state, the mounting features 27 of the flexible elongated body 26 must deform elastically when the seal mounting rib 61 is inserted into the mounting channel 59. As the seal mounting rib 61 is inserted into the mounting channel 59 the mounting structure side walls 58 are deformed elastically away from one another and each of the gripper lips 60 is deformed elastically toward the mounting structure side wall 58 that it is mounted to and toward the mounting structure base wall 57. Once the flexible elongated seal 37 is mounted to the seal mounting component 42 with the seal mounting rib 61 disposed within the mounting channel 59, normal forces are present between the seal mounting rib 61 and the mounting structure side walls 58 as a result of the outward elastic deformation of the mounting structure side walls 58. The normal forces between the seal mounting rib 61 and the mounting structure side walls 58 result in friction between the mounting structure side walls 58 and the seal mounting rib 61. In the preferred embodiment, the friction between the mounting structure side walls 58 and the seal mounting rib 61 is what maintains attachment of the flexible elongated seal 37 to the seal mounting component 42. The gripper lips 60 that depend from the mounting structure side walls 58 are also instrumental in maintaining the engagement of the flexible elongated seal 37 to the seal mounting component 42. Due to their disposition relative to the mounting structure side walls 28 when they are in their free state, the gripper lips 60 apply a greater normal force to the seal mounting rib 61 when the elongated body 26 moves away from the seal mounting rib 61 than when it moves toward the seal mounting rib 61. Thus, as a result of the gripper lips 60, it takes a greater force to withdraw the seal mounting rib 61 from the mounting channel 59 than it does to insert the seal mounting rib 61 in the mounting channel.

The greater the normal forces are between the mounting structure side walls 58 and the seal mounting rib 61, the greater the frictional forces that maintain attachment of the flexible elongated seal 37 to the seal mounting component 42 will be. As was mentioned above, the elongated body 26 of the flexible elongated seal 37 is constructed primarily of a soft, flexible, durable, material. The mounting structure base wall 57, and the mounting structure side walls 58 generally are constructed of the soft, flexible, durable material that the other portions of the elongated body 26 are primarily constructed of. Absent other structure, the mounting structure side walls 58, constructed of such a soft, flexible, durable material, would elastically deform outwardly in a very compliant manner and would exert very small normal forces upon the seal mounting rib 61 when it were disposed within the mounting channel 59 of the elongated body 26. In the preferred embodiment the reinforcements 21 of the flexible elongated seal 37 stiffen the mounting structure side walls 58 from elastically deforming away from one another. In the preferred embodiment, each of the coils 22 of the first wire mesh reinforcement 44 and the second wire mesh reinforcement 52 is U-shaped with a arch portion 64 and a two legs 65 that extend parallel to one another in a same direction from opposite ends of the arch portion 64 of the coil 22. In the preferred embodiment, both the first wire mesh reinforcement 44 and the second wire mesh reinforcement 52 are embedded in the elongated body with the arch portion 64 of each of their coils 22 disposed within the mounting structure base wall 57 of the elongated body 26. Also in the preferred embodiment the first wire mesh reinforcement 44 and the second wire mesh reinforcement 52 are embedded within the elongated body 26 in such a position that one of the two legs 65 of each of their coils 22 is disposed within each of the mounting structure side walls 58 of the elongated body 26. In the preferred embodiment, the rigid reinforcement 24 of the flexible elongated seal 37 is also constructed such that cross-sections of the rigid reinforcement 24 perpendicular to its longitudinal axis 25 are U-shaped. The U-shaped cross-sections of the rigid reinforcement 24 comprise an arch portion 64 and two legs 65 that extend parallel to one another in a same direction from opposite ends of the arch portion 65 of the rigid reinforcement 24. In the preferred embodiment, the rigid reinforcement 24 is embedded within the elongated body 26 in a position such that its arch portion 64 is disposed within the mounting structure base wall 57 of the elongated body 26. In the preferred embodiment the disposition of the rigid reinforcement 24 is also such that one of the two legs 65 of the rigid reinforcement 24 is disposed within each of the mounting structure side walls 58 of the elongated body 26. Thus, for those portions of the elongated body 26 along its central axis 18 that are reinforced by either type of reinforcement 21, the mounting structure side walls 58 are stiffened against elastically deforming away from one another. Mounting structure side walls 58 so stiffened by reinforcements 21, exert substantially greater normal forces upon the seal mounting rib 61 than they would if they were not stiffened by the reinforcements 21 of the elongated body 26. Thus, the strength of the frictional engagement of the mounting structure side walls 58 to the seal mounting rib 61, and therefore the strength of the engagement of the flexible elongated seal 37 to the seal mounting component 42 is increased by the reinforcements 21 of the elongated body 26.

As was mentioned above, the flexible elongated seal 37 of the present invention may be included in any of a number of different types of assemblies 39. In the preferred embodiment, the flexible elongated seal 37 is part of an occupant cabin 11 of a vehicle 10. As is well known, an occupant cabin 11 of a vehicle 10 is a structure within which individuals may be at least partially isolated from undesirable elements of an environment surrounding the occupant cabin 11. There are a number of well known applications for flexible elongated seals 37 in the construction of occupant cabins 11 of vehicles 10 and the flexible elongated seal 37 of the present invention could be utilized in virtually all such known applications. Flexible elongated seals are most commonly used to seal gaps 38 between doors 13 and door frames 66 and to seal gaps 38 between windows 51 and window frames 15 of occupant cabins 11. In the preferred embodiment, the flexible elongated seal 37 is used to seal a relatively long narrow gap 38 between a window 51 (which, in the case of vehicles 10 consists of window glass 13) and a window frame 15 of an occupant cabin 11 when the relatively long narrow gap 38 between the window 51 and the window frame 15 of the occupant cabin 11 is present. As is alluded to above, the relatively long narrow gap 38 between the window 51 and the window frame 15 of the occupant cabin 11 does not always exist because the relatively long narrow gap 38 is not present when the window 51 of the occupant cabin 11 is in an open position. In this embodiment the flexible elongated seal 37 is preferably mounted to a window frame 15 of the occupant cabin 11. The sealing features 28 defined by the elongated body 26 of the flexible elongated seal 37 include a gap bridge 43 that extends continuously along substantially the entire length of the elongated body 26 of the flexible elongated seal 37. The construction of the elongated body 26 and it engagement to the window frame 15 of the occupant cabin 11 is such that the gap bridge 43 is disposed within and substantially fills and seals a gap 38 between the window glass 13 and the window frame 15 of the occupant cabin 11, when the window glass 13 is in a closed position. In the preferred embodiment, the window frame 15 to which the flexible elongated seal 37 is mounted comprises a straight section 55 at the top, a corner section 53 with a small radius of curvature at each end of the straight section 55 at the top, and a gently curving section 54 that extends downwardly from each corner section 53. The flexible elongated seal 37 of the preferred embodiment is mounted to the window frame 15 with its rigid reinforcement 24 disposed adjacent the straight section 55 at the top of the window frame 15. The flexible elongated seal 37 is also mounted such that one of its first wire mesh reinforcement 44 and second wire mesh reinforcement 52 is disposed adjacent each gently curving section 53 that extends downward from the corner sections 53 of the window frame. The portions of the elongated body 26 that are disposed between the rigid reinforcement 24 and the wire mesh reinforcements 44,52 and that lack reinforcements 21 are disposed adjacent the corner portions 53 of the window frame 15.

The preferred embodiment of the flexible elongated seal 37 has sealing features 28 that are specially adapted to the use of the flexible elongated seal 37 for sealing a gap 38 between a window frame 15 and corresponding window glass 14 of an occupant cabin 11. In the preferred embodiment the window glass 14 is mounted to the occupant cabin 11 in such a manner that it is slideable within the window frame 15 to any position between its closed position and its open position. When the window glass 14 is in its open position it is disposed substantially entirely within a cavity 67 defined within the structure of the occupant cabin 11 adjacent the window opening 16. When the window glass 14 is in its closed position it is disposed within and substantially completely fills the window opening 14. Such a construction of a window frame 15 and window glass 14 of an occupant cabin 11 are well known. In the preferred embodiment, the window frame 15 defines a glass engagement surface 68 that extends around a substantial portion of the window frame. The glass engagement surface 68 is oriented such that it is substantially perpendicular to the pane 69 of the window glass 15 and the glass engagement surface 68 is positioned such that it is aligned with an outer edge 70 of the window glass 14 when the window glass 14 is in its closed position. In the preferred embodiment the glass engagement surface 68 of the window frame 15 is disposed adjacent the seal mounting rib 61 defined by the window frame 15. In the preferred embodiment the flexible elongated seal 37 is constructed such that when it is properly mounted to the window frame 15 the gap bridge 43 extends around the window frame 15 adjacent the glass engagement surface 68 of the window frame 15. Thus, when the window glass 14 is in its closed position, the gap bridge 43 is disposed between the outer edge 70 of the window glass 14 and the glass engagement surface 68 of the window frame 15 and seals the window glass 14 to the window frame 15. In the preferred embodiment the elongated body 26 of the flexible elongated seal 37 also defines two sealing structure side walls 71 that extend parallel to one another a short distance in a same direction perpendicular to the central axis 18 of the elongated body 26 along substantially the entire length of the elongated body 26. A window glass channel 72 is defined between the sealing structure side walls 71 of the flexible elongated seal 37 along substantially its entire length. In the preferred embodiment, the construction of the flexible elongated seal 37 and its engagement to the window frame 15 is such that when the window glass 14 is in its closed position a portion of the window glass 14 adjacent its outer edge 70 is disposed within the window glass channel 72. Portions of the window glass 14 adjacent its outer edge 70 also slide within the window glass channel 72 as the window glass 14 is slid between its open and closed positions.

The vehicle 10 that comprises the occupant cabin 11 to which the flexible elongated seal 37 is mounted in the preferred embodiment also comprises a number of other components. The vehicle also includes one or more frame assemblies 73 that are engaged to the occupant cabin 11. The one or more frame assemblies 73 are relatively large strong assemblies that provide mounting and support directly or indirectly for a large number of components of the vehicle 11. The vehicle 10 also comprises a suspension system 74 engaged to the one or more frame assemblies 73. The suspension system 74 supports the vehicle 10 upon the ground and provides the vehicle 10 with a relatively low resistance to movement along the ground. The vehicle 10 may also comprise a powertrain 75 engaged to the one or more of the frame assemblies 73 and the suspension system 74 of the vehicle 10. A powertrain 75, if included in the vehicle 10, would provide motivation to move the vehicle 10 along the ground.

Those skilled in the art will appreciate that modifications could be made to the invention as described without departing from the spirit and scope of the invention and thus the scope of the invention is limited only by the following claims.

I claim:

1. A flexible elongated seal mounted to a seal mounting component of an assembly that has two or more components disposed adjacent one another in such a manner that one or more relatively narrow gaps are defined between two or more of the two or more components of the assembly wherein said seal mounting component thereof may define a seal mounting rib which has a mounting rib width, said flexible elongated seal comprising:

(a) an elongated body that is constructed primarily of a soft, flexible, durable material and that has a length many times greater than a largest sectional width of said elongated body;

(b) a first wire mesh reinforcement embedded in said elongated body;

(c) a rigid reinforcement embedded in said elongated body;

(d) wherein said elongated body of said flexible elongated seal defines mounting features that facilitate mounting of said flexible elongated seal to the seal mounting component of the assembly;

(e) wherein said elongated body of said flexible elongated seal defines sealing features constructed and positioned such that, when said flexible elongated seal is properly mounted to the seal mounting component of the assembly, and when the components of the assembly are disposed adjacent one another in such a manner that one or more relatively narrow gaps are defined between two or more of the components of the assembly, at least some portion of said sealing features of said elongated body is disposed within and seals one of the one or more relatively narrow gaps defined between two or more of the components of the assembly along substantially an entire length of said flexible elongated seal;

(f) wherein said first wire mesh reinforcement and said rigid reinforcement are embedded within said soft, flexible, durable material of said elongated body of said flexible elongated seal at different axial positions along a central axis of said elongated body;

(g) wherein said first wire mesh reinforcement comprises a wire body that is constructed of a material that is relatively stiff as compared to said soft, flexible, durable material of said elongated body;

(h) wherein said wire body of said first wire mesh reinforcement forms a plurality of coils that are spaced from one another along said central axis of said elongated body of said flexible elongated seal;

(i) wherein each of said coils of said first wire mesh reinforcement is disposed within a cross-section of said elongated body that is disposed substantially perpendicular to said central axis of said elongated body;

(j) wherein adjacent coils of said first wire mesh reinforcement are connected by sections of said wire body that extend substantially parallel to said central axis of said elongated body;

(k) wherein said first wire mesh reinforcement provides substantial stiffening against sectional deformation of a section of said elongated body within which it is embedded;

(l) wherein said first wire mesh reinforcement provides a limited amount of stiffening against axial bending of said section of said elongated body within which it is embedded;

(m) wherein said rigid reinforcement that is embedded within said elongated body comprises a continuous member that is constructed of a material that is relatively stiff as compared to said soft, flexible, durable material that said rigid reinforcement is embedded within;

(n) wherein said rigid reinforcement is embedded within said elongated body in such an orientation that a longitudinal axis of said continuous member is disposed substantially parallel to said central axis of said elongated body;

(o) wherein said rigid reinforcement is constructed such that substantially all cross-sections of said continuous member perpendicular to said longitudinal axis of said continuous member have a relatively large moment of inertia about all axes perpendicular to said longitudinal axis of said continuous member;

(p) wherein said rigid reinforcement provides substantial stiffening against both sectional deformation and axial bending of a section of said elongated body within which it is embedded; and (q) wherein said flexible elongated seal is constructed in such a manner that at least some portions of said flexible elongated seal can be substantially elastically bent along said central axis of said elongated body.

2. The flexible elongated seal of claim 1 further comprising:

(a) a second wire mesh reinforcement of similar construction to said first wire mesh reinforcement; and (b) wherein said second wire mesh reinforcement is oriented within said elongated body in such an orientation that a longitudinal axis of said second wire mesh reinforcement is disposed substantially parallel to said central axis of said elongated body.

3. The flexible elongated seal of claim 2, wherein:

(a) said rigid reinforcement is disposed between said first wire mesh reinforcement and said second wire mesh reinforcement along said central axis of said elongated body of said flexible elongated seal.

4. The flexible elongated seal of claim 3, wherein:

(a) a relatively short portion of said elongated body that is disposed between said first wire mesh reinforcement and said rigid reinforcement lacks any reinforcement; and (b) a relatively short portion of said elongated body that is disposed between said rigid reinforcement and said second wire mesh reinforcement also lacks any reinforcement.

5. The flexible elongated seal of claim 4, wherein:

(a) said mounting features of said flexible elongated seal comprise a mounting structure base wall that is defined by said elongated body and that extends a short distance in a direction perpendicular to said central axis of said elongated body and also along substantially an entire length of said elongated body;

(b) said mounting features of said flexible elongated seal further comprise two mounting structure side walls that are defined by said elongated body and that extend parallel to one another in a same direction from said mounting structure base wall along substantially an entire length of said flexible elongated seal;

(c) a mounting channel of said flexible elongated seal is defined between said two mounting structure side walls defined by said elongated body.

6. The flexible elongated seal of claim 5, wherein:

(a) said mounting channel defined by said elongated body has a mounting channel width that is smaller than the mounting rib width of the seal mounting rib of the seal mounting component when said flexible elongated seal is in its free state.

7. The flexible elongated seal of claim 6, wherein:

(a) said rigid reinforcement is constructed such that cross-sections of said continuous member of said rigid reinforcement perpendicular to said longitudinal axis of said rigid reinforcement are U-shaped;

(b) said U-shaped cross-sections of said rigid reinforcement comprise an arch portion and two legs;

(c) wherein said two legs of said U-shaped cross-sections of said rigid reinforcement extend parallel to one another in a same direction from opposite ends of said arch portion of said U-shaped cross-sections of said rigid reinforcement;

(d) wherein each of said coils of said first wire mesh reinforcement is U-shaped;

(e) wherein each of said U-shaped coils of said first wire mesh reinforcement comprises an arch portion and two legs;

(f) wherein said two legs of said U-shaped coils of said first wire mesh reinforcement extend parallel to one another in a same direction from opposite ends of said arch portion of said U-shaped coils of said first wire mesh reinforcement;

(g) wherein each of said coils of said second wire mesh reinforcement is U-shaped;

(h) wherein each of said U-shaped coils of said second wire mesh reinforcement comprises an arch portion and two legs;

(i) wherein said two legs of said U-shaped coils of said second wire mesh reinforcement extend parallel to one another in a same direction from opposite ends of said arch portion of said U-shaped coils of said second wire mesh reinforcement;

(j) wherein said rigid reinforcement is embedded within said elongated body in such a position and orientation that said arch portion of said U-shaped cross-sections of said rigid reinforcement is embedded within said mounting structure base wall defined by said elongated body;

(k) wherein said rigid reinforcement is embedded within said elongated body in such a position and orientation that one of said legs of said U-shaped cross-sections of said rigid reinforcement is embedded within each one of said mounting structure side walls defined by said elongated body;

(l) wherein said first wire mesh reinforcement is embedded within said elongated body in such a position and orientation that said arch portion of each of said U-shaped coils of said first wire mesh reinforcement is embedded within said mounting structure base wall defined by said elongated body;

(m) wherein said first wire mesh reinforcement is embedded within said elongated body in such a position and orientation that one of said legs of each of said U-shaped coils of said first wire mesh reinforcement is embedded within each one of said mounting structure side walls defined by said elongated body;

(n) wherein said second wire mesh reinforcement is embedded within said elongated body in such a position and orientation that said arch portion of each of said U-shaped coils of said second wire mesh reinforcement is embedded within said mounting structure base wall defined by said elongated body; and (o) wherein said second wire mesh reinforcement is embedded within said elongated body in such a position and orientation that one of said legs of each of said U-shaped coils of said second wire mesh reinforcement is embedded within each one of said mounting structure side walls defined by said elongated body.

8. The flexible elongated seal of claim 1, wherein:

(a) said mounting features of said flexible elongated seal comprise a mounting structure base wall that is defined by said elongated body and that extends a short distance in a direction perpendicular to said central axis of said elongated body and also along substantially an entire length of said elongated body;

(b) said mounting features of said flexible elongated seal further comprise two mounting structure side walls that are defined by said elongated body and that extend parallel to one another in a same direction from said mounting structure base wall along substantially an entire length of said flexible elongated seal;

(c) a mounting channel of said flexible elongated seal is defined between said two mounting structure side walls defined by said elongated body.

9. The flexible elongated seal of claim 8, wherein:

(a) said mounting channel defined by said elongated body has a mounting channel width that is smaller than the mounting rib width of the seal mounting rib of the seal mounting component.

10. The flexible elongated seal of claim 9, wherein:

(a) said rigid reinforcement is constructed such that cross-sections of said continuous member of said rigid reinforcement perpendicular to said longitudinal axis of said rigid reinforcement are U-shaped;

(b) said U-shaped cross-sections of said rigid reinforcement comprise an arch portion and two legs;

(c) wherein said two legs of said U-shaped cross-sections of said rigid reinforcement extend parallel to one another in a same direction from opposite ends of said arch portion of said U-shaped cross-sections of said rigid reinforcement;

(d) wherein each of said coils of said first wire mesh reinforcement is U-shaped;

(e) wherein each of said U-shaped coils of said first wire mesh reinforcement comprises an arch portion and two legs;

(f) wherein said two legs of said U-shaped coils of said first wire mesh reinforcement extend parallel to one another in a same direction from opposite ends of said arch portion of said U-shaped coils of said first wire mesh reinforcement;

(g) wherein said rigid reinforcement is embedded within said elongated body in such a position and orientation that said arch portion of said U-shaped cross-sections of said rigid reinforcement is embedded within said mounting structure base wall defined by said elongated body;

(h) wherein said rigid reinforcement is embedded within said elongated body in such a position and orientation that one of said legs of said U-shaped cross-sections of said rigid reinforcement is embedded within each one of said mounting structure side walls defined by said elongated body;

(i) wherein said first wire mesh reinforcement is embedded within said elongated body in such a position and orientation that said arch portion of each of said U-shaped coils of said first wire mesh reinforcement is embedded within said mounting structure base wall defined by said elongated body;

(j) wherein said first wire mesh reinforcement is embedded within said elongated body in such a position and orientation that one of said legs of each of said U-shaped coils of said first wire mesh reinforcement is embedded within each one of said mounting structure side walls defined by said elongated body.

11. A vehicle, comprising:

(a) one or more frame assemblies;

(b) a suspension system engaged to one or more of said one or more frame assemblies;

(c) an occupant cabin engaged to said one or more frame assemblies;

(d) wherein said occupant cabin comprises a seal mounting component;

(e) wherein said occupant cabin is constructed in such a manner that said seal mounting component and one or more other components of said occupant cabin are or may be positioned relative to one another such that a relatively long narrow gap exists between them;

(f) wherein said occupant cabin further comprises a flexible elongated seal that is mounted to said seal mounting component;

(g) wherein said flexible elongated seal comprises an elongated body that is constructed primarily of a soft, flexible, durable material and that has a length many times greater than a largest sectional width of said elongated body;

(h) wherein said flexible elongated seal comprises a first wire mesh reinforcement embedded in said elongated body;

(i) wherein said flexible elongated seal comprises a rigid reinforcement embedded in said elongated body;

(j) wherein said elongated body of said flexible elongated seal defines mounting features that are engaged to said seal mounting component of said occupant cabin;

(k) wherein said elongated body of said flexible elongated seal defines sealing features;

(l) wherein said flexible elongated seal is constructed and positioned such that, when said seal mounting component and said one or more other components of said occupant cabin are positioned relative to one another in such a manner that said relatively long narrow gap exists between them, some portion of said sealing features of said flexible elongated seal are disposed within and substantially fill and seal said relatively long narrow gap along substantially an entire length of said flexible elongated seal;

(m) wherein said first wire mesh reinforcement and said rigid reinforcement are embedded within said soft, flexible, durable material of said elongated body of said flexible elongated seal at different axial positions along a central axis of said elongated body;

(n) wherein said first wire mesh reinforcement comprises a wire body that is constructed of a material that is relatively stiff as compared to said soft, flexible, durable material of said elongated body;

(o) wherein said wire body of said first wire mesh reinforcement forms a plurality of coils that are spaced from one another along said central axis of said elongated body of said flexible elongated seal;

(p) wherein each of said coils of said first wire mesh reinforcement is disposed within a cross-section of said elongated body that is disposed substantially perpendicular to said central axis of said elongated body;

(q) wherein adjacent coils of said first wire mesh reinforcement are connected by sections of said wire body that extend substantially parallel to said central axis of said elongated body;

(r) wherein said first wire mesh reinforcement provides substantial stiffening against sectional deformation of a section of said elongated body within which it is embedded;

(s) wherein said first wire mesh reinforcement provides a limited amount of stiffening against axial bending of said section of said elongated body within which it is embedded;

(t) wherein said rigid reinforcement that is embedded within said elongated body comprises a continuous member that is constructed of a material that is relatively stiff as compared to said soft, flexible, durable material that said rigid reinforcement is embedded within;

(u) wherein said rigid reinforcement is embedded within said elongated body in such an orientation that a longitudinal axis of said continuous member is disposed substantially parallel to said central axis of said elongated body;

(v) wherein said rigid reinforcement is constructed such that substantially all cross-sections of said continuous member perpendicular to said longitudinal axis of said continuous member have a relatively large moment of inertia about all axes perpendicular to said longitudinal axis of said continuous member;

(w) wherein said rigid reinforcement provides substantial stiffening against both sectional deformation and axial bending of a section of said elongated body within which it is embedded; and (x) wherein said flexible elongated seal is constructed in such a manner that at least some portions of said flexible elongated seal can be substantially elastically bent along said central axis of said elongated body.

12. The vehicle of claim 11, wherein:

(a) said flexible elongated seal further comprises a second wire mesh reinforcement of similar construction to said first wire mesh reinforcement; and (b) wherein said second wire mesh reinforcement is oriented within said elongated body in such an orientation that a longitudinal axis of said second wire mesh reinforcement is disposed substantially parallel to said central axis of said elongated body.

13. The vehicle of claim 12, wherein:

(a) said rigid reinforcement is disposed between said first wire mesh reinforcement and said second wire mesh reinforcement along said central axis of said elongated body of said flexible elongated seal.

14. The vehicle of claim 13, wherein:

(a) a relatively short portion of said elongated body that is disposed between said first wire mesh reinforcement and said rigid reinforcement lacks any reinforcement; and (b) a relatively short portion of said elongated body that is disposed between said rigid reinforcement and said second wire mesh reinforcement also lacks any reinforcement.

15. The vehicle of claim 14, wherein:

(a) said seal mounting component of said occupant cabin defines a window frame within which a window opening is defined;

(b) said occupant cabin further comprises window glass which is mounted to said occupant cabin in such a manner that said window glass can be selectively slideably moved between an open position and a closed position;

(c) when said window glass is disposed in its open position said window glass is disposed substantially outside said window opening defined within said window frame;

(d) when said window glass is disposed in its closed position said window glass is disposed within and extends across substantially all portions of said window opening defined within said window frame;

(e) said relatively long narrow gap within which said sealing features of said flexible elongated seal are to be disposed and substantially fill and seal is a relatively long narrow gap that exists between an outer edge of said window glass and said window frame when said window glass is disposed in its closed position;

(f) said flexible elongated seal is mounted to said seal mounting component around at least a portion of a perimeter of said window frame;

(g) said flexible elongated seal is constructed and positioned such that, when said window glass is in its closed position, some portion of said sealing features defined by said elongated body are disposed within and substantially fill and seal said relatively long narrow gap between said outer edge of said window glass and said window frame along substantially an entire length of said flexible elongated seal.

16. The vehicle of claim 14, wherein:

(a) said seal mounting component comprises a seal mounting rib that extends along an outer surface of said seal mounting component;

(b) said mounting features of said flexible elongated seal comprise a mounting structure base wall that is defined by said elongated body and that extends a short distance in a direction perpendicular to said central axis of said elongated body and also along substantially an entire length of said elongated body;

(c) said mounting features of said flexible elongated seal further comprise two mounting structure side walls that are defined by said elongated body and that extend parallel to one another in a same direction from said mounting structure base wall along substantially an entire length of said flexible elongated seal;

(d) a mounting channel of said flexible elongated seal is defined between said two mounting structure side walls defined by said elongated body; and (e) said flexible elongated seal is mounted to said seal mounting component with said seal mounting rib disposed in said mounting channel defined by said mounting features of said elongated body.

17. The vehicle of claim 16, wherein:

(a) said flexible elongated seal is of such a construction that when said elongated body of said flexible elongated seal is in its free state, said mounting channel defined by said elongated body has a mounting channel width that is smaller than a mounting rib width of said seal mounting rib of said seal mounting component and said two mounting structure side walls are elastically deformed away from one another as compared to the relative position they occupy in their free state.

18. The vehicle of claim 17, wherein:

(a) said rigid reinforcement is constructed such that cross-sections of said continuous member of said rigid reinforcement perpendicular to said longitudinal axis of said rigid reinforcement are U-shaped;

(b) said U-shaped cross-sections of said rigid reinforcement comprise an arch portion and two legs;

(c) wherein said two legs of said U-shaped cross-sections of said rigid reinforcement extend parallel to one another in a same direction from opposite ends of said arch portion of said U-shaped cross-sections of said rigid reinforcement;

(d) wherein each of said coils of said first wire mesh reinforcement is U-shaped;

(e) wherein each of said U-shaped coils of said first wire mesh reinforcement comprises an arch portion and two legs;

(f) wherein said two legs of said U-shaped coils of said first wire mesh reinforcement extend parallel to one another in a same direction from opposite ends of said arch portion of said U-shaped coils of said first wire mesh reinforcement;

(g) wherein each of said coils of said second wire mesh reinforcement is U-shaped;

(h) wherein each of said U-shaped coils of said second wire mesh reinforcement comprises an arch portion and two legs;

(i) wherein said two legs of said U-shaped coils of said second wire mesh reinforcement extend parallel to one another in a same direction from opposite ends of said arch portion of said U-shaped coils of said second wire mesh reinforcement;

(j) wherein said rigid reinforcement is embedded within said elongated body in such a position and orientation that said arch portion of said U-shaped cross-sections of said rigid reinforcement is embedded within said mounting structure base wall defined by said elongated body;

(k) wherein said rigid reinforcement is embedded within said elongated body in such a position and orientation that one of said legs of said U-shaped cross-sections of said rigid reinforcement is embedded within each one of said mounting structure side walls defined by said elongated body;

(l) wherein said first wire mesh reinforcement is embedded within said elongated body in such a position and orientation that said arch portion of each of said U-shaped coils of said first wire mesh reinforcement is embedded within said mounting structure base wall defined by said elongated body;

(m) wherein said first wire mesh reinforcement is embedded within said elongated body in such a position and orientation that one of said legs of each of said U-shaped coils of said first wire mesh reinforcement is embedded within each one of said mounting structure side walls defined by said elongated body;

(n) wherein said second wire mesh reinforcement is embedded within said elongated body in such a position and orientation that said arch portion of each of said U-shaped coils of said second wire mesh reinforcement is embedded within said mounting structure base wall defined by said elongated body; and (o) wherein said second wire mesh reinforcement is embedded within said elongated body in such a position and orientation that one of said legs of each of said U-shaped coils of said second wire mesh reinforcement is embedded within each one of said mounting structure side walls defined by said elongated body.

19. The vehicle of claim 11, wherein:

(a) said seal mounting component of said occupant cabin defines a window frame within which a window opening is defined;

(b) said occupant cabin further comprises window glass which is mounted to said occupant cabin in such a manner that said window glass can be selectively slideably moved between an open position and a closed position;

(c) when said window glass is disposed in its open position said window glass is disposed substantially outside said window opening defined within said window frame;

(d) when said window glass is disposed in its closed position said window glass is disposed within and extends across substantially all portions of said window opening defined within said window frame;

(e) said relatively long narrow gap within which said sealing features of said flexible elongated seal are to be disposed and substantially fill and seal is a relatively long narrow gap that exists between an outer edge of said window glass and said window frame when said window glass is disposed in its closed position;

(f) said flexible elongated seal is mounted to said seal mounting component around at least a portion of a perimeter of said window frame;

(g) said flexible elongated seal is constructed and positioned such that, when said window glass is in its closed position, some portion of said sealing features defined by said elongated body are disposed within and substantially fill and seal said relatively long narrow gap between said outer edge of said window glass and said window frame along substantially an entire length of said flexible elongated seal.

20. The vehicle of claim 19, wherein:

(a) said flexible elongated seal is mounted to said window frame in such a manner that said rigid reinforcement is disposed adjacent a straight portion of said perimeter of said window frame; and (b) said flexible elongated seal is mounted to said window frame in such a manner that said first wire mesh reinforcement is disposed adjacent a gently curving portion of said perimeter of said window frame.

21. The vehicle of claim 19, wherein:

(a) said flexible elongated seal is mounted to said window frame in such a manner that said rigid reinforcement is disposed adjacent a straight portion of said perimeter of said window frame;

(b) said flexible elongated seal is mounted to said window frame in such a manner that said relatively short portion of said elongated body, disposed between said rigid reinforcement and said first wire mesh reinforcement, that lacks reinforcement is disposed adjacent a first corner portion, with a relatively small radius of curvature, of said perimeter of said window frame;

(c) said flexible elongated seal is mounted to said window frame in such a manner that said relatively short portion of said elongated body, disposed between said rigid reinforcement and said second wire mesh reinforcement, that lacks reinforcement is disposed adjacent a second corner portion, with a relatively small radius of curvature, of said perimeter of said window frame;

(d) said flexible elongated seal is mounted to said window frame in such a manner that said first wire mesh reinforcement is disposed adjacent a first gently curving portion of said perimeter of said window frame; and (e) said flexible elongated seal is mounted to said window frame in such a manner that said second wire mesh reinforcement is disposed adjacent a second gently curving portion of said perimeter of said window frame.

22. The vehicle of claim 21, wherein:

(a) said straight portion of said perimeter of said window frame adjacent which said rigid reinforcement of said flexible elongated seal is disposed is disposed substantially horizontal and is an upper portion of said perimeter of said window frame;

(b) said perimeter of said window frame extends from said straight portion, adjacent which said rigid reinforcement of said flexible elongated seal is disposed, around said first corner portion and down said first gently curving portion which is disposed substantially vertically; and (c) said perimeter of said window frame extends from said straight portion, adjacent which said rigid reinforcement of said flexible elongated seal is disposed, around said second corner portion and down said second gently curving portion which is disposed substantially vertically.

23. The vehicle of claim 22, wherein:

(a) said seal mounting component of said occupant cabin comprises a seal mounting rib that extends around at least a portion of said perimeter of said window frame that said flexible elongated seal extends around;

(b) said mounting features of said flexible elongated seal comprise a mounting structure base wall that is defined by said elongated body and that extends a short distance in a direction perpendicular to said central axis of said elongated body and also along substantially an entire length of said elongated body;

(c) said mounting features of said flexible elongated seal further comprise two mounting structure side walls that are defined by said elongated body and that extend in parallel to one another in a same direction from said mounting structure base wall along substantially an entire length of said flexible elongated seal;

(d) a mounting channel of said flexible elongated seal is defined between said two mounting structure side walls defined by said elongated body; and (e) said flexible elongated seal is mounted to said seal mounting component with said seal mounting rib disposed in said mounting channel defined by said mounting features of said elongated body.

24. The vehicle of claim 23, wherein:

(a) said flexible elongated seal is of such a construction that when said elongated body of said flexible elongated seal is in its free state, said mounting channel defined by said elongated body has a mounting channel width that is somewhat smaller than a mounting rib width of said seal mounting rib of said seal mounting component and said two mounting structure side walls are elastically deformed away from one another as compared to the relative position they occupy in their free state.

25. The vehicle of claim 24, wherein:

(a) said rigid reinforcement is constructed such that cross-sections of said continuous member of said rigid reinforcement perpendicular to said longitudinal axis of said rigid reinforcement are U-shaped;

(b) said U-shaped cross-sections of said rigid reinforcement comprise an arch portion and two legs;

(c) wherein said two legs of said U-shaped cross-sections of said rigid reinforcement extend parallel to one another in a same direction from opposite ends of said arch portion of said U-shaped cross-sections of said rigid reinforcement;

(d) wherein each of said coils of said first wire mesh reinforcement is U-shaped;

(e) wherein each of said U-shaped coils of said first wire mesh reinforcement comprises an arch portion and two legs;

(f) wherein said two legs of said U-shaped coils of said first wire mesh reinforcement extend parallel to one another in a same direction from opposite ends of said arch portion of said U-shaped coils of said first wire mesh reinforcement;

(g) wherein said rigid reinforcement is embedded within said elongated body in such a position and orientation that said arch portion of said U-shaped cross-sections of said rigid reinforcement is embedded within said mounting structure base wall defined by said elongated body;

(h) wherein said rigid reinforcement is embedded within said elongated body in such a position and orientation that one of said legs of said U-shaped cross-sections of said rigid reinforcement is embedded within each one of said mounting structure side walls defined by said elongated body;

(i) wherein said first wire mesh reinforcement is embedded within said elongated body in such a position and orientation that said arch portion of each of said U-shaped coils of said first wire mesh reinforcement is embedded within said mounting structure base wall defined by said elongated body;

(a) wherein said first wire mesh reinforcement is embedded within said elongated body in such a position and orientation that one of said legs of each of said U-shaped coils of said first wire mesh reinforcement is embedded within each one of said mounting structure side walls defined by said elongated body.

\* \* \* \* \*